United States Patent
Gouda et al.

(10) Patent No.: US 12,319,580 B2
(45) Date of Patent: Jun. 3, 2025

(54) MULTIWALLED CARBON NANOTUBE AND A PHOTOCATALYSIS PROCESS FOR PRODUCING HYDROGEN AND CARBON NANOSTRUCTURES

(71) Applicants: Abdelaziz Medhat Abdelaziz Ahmed Gouda, North York (CA); Camilo Viasus Perez, Montreal (CA); Mohini Mohan Sain, Toronto (CA); Geoffrey Alan Stuart Ozin, Toronto (CA)

(72) Inventors: Abdelaziz Medhat Abdelaziz Ahmed Gouda, North York (CA); Camilo Viasus Perez, Montreal (CA); Mohini Mohan Sain, Toronto (CA); Geoffrey Alan Stuart Ozin, Toronto (CA)

( * ) Notice: Subject to any disclaimer, the term of this patent is extended or adjusted under 35 U.S.C. 154(b) by 0 days.

(21) Appl. No.: 18/653,364

(22) Filed: May 2, 2024

(65) Prior Publication Data
US 2024/0409412 A1 Dec. 12, 2024

Related U.S. Application Data

(60) Provisional application No. 63/471,904, filed on Jun. 8, 2023.

(51) Int. Cl.
*C01B 32/162* (2017.01)
*C01B 3/26* (2006.01)

(52) U.S. Cl.
CPC .............. *C01B 32/162* (2017.08); *C01B 3/26* (2013.01); *C01B 2202/06* (2013.01);
(Continued)

(58) Field of Classification Search
CPC ..... C01B 32/162; C01B 3/26; C01B 2202/06; C01B 2202/32; C01B 2202/34;
(Continued)

(56) References Cited

U.S. PATENT DOCUMENTS

| 5,556,517 A * | 9/1996 | Smalley | C01B 32/15 |
| | | | 423/445 B |
| 2006/0099136 A1 | 5/2006 | Dillon et al. | |

(Continued)

FOREIGN PATENT DOCUMENTS

WO 2009020958 A2 2/2009

OTHER PUBLICATIONS

Pinilla, et al., Metallic and carbonaceous-based catalysts performance in the solar catalytic decomposition of methane for hydrogen and carbon production, International Journal of Hydrogen Energy 2012; 37: 9645-9655 (Year: 2012).*

(Continued)

*Primary Examiner* — Daniel C. McCracken
(74) *Attorney, Agent, or Firm* — HILL & SCHUMACHER

(57) ABSTRACT

A multiwalled carbon nanotube includes at least 2 carbon nanotube walls. The multiwalled carbon nanotube have an outer surface and at least a portion of an oxygen functional group is attached to the outer surface thereof. Up to 5 atomic percent of the multiwalled carbon nanotube surface is an oxygen functional group. The surface atomic ratio of carbon to oxygen is between 17:1 and 19:1. A photocatalysis process to produce hydrogen and at least one solid carbon nanostructure includes the steps of: applying light to saturated hydrocarbons in the presence of a metal particle supported metal oxide photocatalyst to produce at least hydrogen gas and at least one solid carbon nanostructure; separating the hydrogen from at least one solid carbon nanostructure; and collecting the separated hydrogen and the at least one solid carbon nanostructure.

21 Claims, 31 Drawing Sheets

(52) U.S. Cl.
CPC ...... *C01B 2202/32* (2013.01); *C01B 2202/34* (2013.01); *C01B 2202/36* (2013.01); *C01B 2203/0277* (2013.01); *C01B 2203/1005* (2013.01); *C01B 2203/1082* (2013.01); *C01B 2203/1235* (2013.01); *C01P 2004/133* (2013.01); *C01P 2004/61* (2013.01); *C01P 2006/12* (2013.01); *C01P 2006/14* (2013.01)

(58) Field of Classification Search
CPC ........ C01B 2202/36; C01B 2203/0277; C01B 2203/1005; C01B 2203/1082; C01B 2203/1235; C01B 32/158; C01B 32/159; C01B 32/16; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/08; C01B 2202/10; C01B 2202/20; C01B 2202/22; C01B 2202/24; C01B 2202/26; C01B 2202/28; C01B 2202/30; C01P 2004/133; C01P 2004/61; C01P 2006/12; C01P 2006/14; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

U.S. PATENT DOCUMENTS

| | | |
|---|---|---|
| 2008/0206125 A1 | 8/2008 | Silvy et al. |
| 2018/0273379 A1 | 9/2018 | Riso et al. |
| 2020/0180961 A1* | 6/2020 | Gracia Caroca .......... B09B 5/00 |
| 2024/0228289 A1 | 7/2024 | Abuseada et al. |

OTHER PUBLICATIONS

"Sunlight," accessed online at https://www.britannica.com/science/sunlight-solar-radiation on Sep. 25, 2024 (Year: 2024).*

Kundu, Shankhamala, et al. "Thermal stability and reducibility of oxygen-containing functional groups on multiwalled carbon nanotube surfaces: a quantitative high-resolution XPS and TPD/TPR study." The Journal of Physical Chemistry C, 112, 43 (2008), pp. 16869-16878.

International Search Report for PCT/CA2024/050776 dated Sep. 9, 2024.

* cited by examiner

| | Optimized system | Optimized system post methane photolysis | Optimized system post methane pyrolysis | Separated MWCNT post methane photolysis |
|---|---|---|---|---|
| BET surface area ($m^2/g$) | 182.75 | 168.54 | 168.40 | 179.93 |
| BJH average pore size (nm) | 12.15 | 6.12 | 5.78 | 5.89 |
| BJH pore volume ($cm^3/g$) | 3.7E-3 | 9.8E-3 | 14.2E-3 | 12.2E-3 |

FIG. 14

MULTIWALLED CARBON NANOTUBE AND A PHOTOCATALYSIS PROCESS FOR PRODUCING HYDROGEN AND CARBON NANOSTRUCTURES

BACKGROUND

The present disclosure relates to multiwalled carbon nanotube and a photocatalysis process for producing hydrogen and carbon nanostructures.

The ongoing increase in the global energy demand and the need to reduce the amount of greenhouse gas (GHG) emissions calls for urgent and aggressive actions to halt global warming and utilize clean, renewable energy sources that can meet the demand and help decarbonize the present day chemical and petrochemical industries. In addition to the well-known GHG carbon dioxide ($CO_2$), curbing methane ($CH_4$) emissions should also be a priority for reducing climate warming effects as, on a molecule-to-molecule basis, it is far more threatening. Although the total emission of $CH_4$ is one-eighth that of $CO_2$, its impact is about 30 times greater than $CO_2$ in terms of its global warming potential and accounts for about 25% of today's GHG induced temperature rise. As such, methane emission mitigation can positively reduce the global warming impact of GHGs faster than the reduction of $CO_2$.

Therefore, a need exists in the field for a novel approach to the solar-powered methane-to-hydrogen conversion process at ambient conditions with the concurrent formation of high-quality CNTs (carbon nanotubes). In addition, there is also a need for an engineered designed photoreactor that will help increase the efficiency of the means of mechanical separating the co-produced CNT from the catalyst to reduce any chemical separation and purification that could affect the quality of the formed CNT.

A further understanding of the functional and advantageous aspects of the disclosure can be realized by reference to the following detailed description and drawings.

SUMMARY

A multiwalled carbon nanotube includes at least 2 carbon nanotube walls. The multiwalled carbon nanotube have an outer surface and at least a portion of an oxygen functional group is attached to the outer surface thereof. Up to 5 atomic percent of the multiwalled carbon nanotube surface is an oxygen functional groups. The surface atomic ratio of carbon to oxygen is between 17:1 and 19:1.

The spacing between the walls of the multiwalled carbon nanotube may be between 3.33 to 6 Å.

Each carbon nanotube wall may have an outer diameter of between 10 to 50 nm.

Each carbon nanotube wall may have a length of between 20 nm to 50 μm length.

The multiwalled carbon nanotube may include between 20 and 50 walls.

The multiwalled carbon nanotube may be a plurality of multiwalled carbon nanotubes including base-growth carbon nanotubes, tip-growth carbon nanotubes, and a combination thereof.

The multiwalled carbon nanotube may be a plurality of multiwalled carbon nanotubes having an average of 40 walls.

The spacing between the carbon nanotube walls may be an average of 3.33 Å.

The multiwalled carbon nanotube may have a plurality of carbon nanotubes having an average outer diameter of 17 nm.

The multiwalled carbon nanotube may be free of amorphous carbon.

The multiwalled carbon nanotube may have a BET (Brunauer-Emmett-Teller) surface area of from 180 $m^2\ g^{-1}$ to 300 $m^2\ g^{-1}$.

The multiwalled carbon nanotube may have a pore volume of from 0.2 $cm^3\ g^{-1}$ to 2.1 $cm^3\ g^{-1}$.

The oxygen functional group may be one of hydroxyl group, molecular oxygen and a combination thereof.

The multiwalled carbon nanotube may be formed into a powder.

A photocatalysis process to produce gaseous hydrogen and at least one solid carbon nanostructure includes the steps of: applying light to saturated hydrocarbons in the presence of a metal particle supported metal oxide photocatalyst to produce at least hydrogen gas and at least one solid carbon nanostructure; separating the hydrogen from at least one solid carbon nanostructure; and collecting the separated hydrogen and the at least one solid carbon nanostructure.

In the photocatalysis process, the saturated hydrocarbons may be one of methane, ethane, propane, butane, hexane, heptane, octane and a combination thereof.

In the photocatalysis process, the metal of the metal supported metal oxide photocatalyst may be one of Ti, Zr, V, Nb, Ta, Cr, Mo, W, Mn, Tc, Re, Fe, Ru, Ni, Pd, Pt, Cu, Ag, Au, Zn, Cd, Hg and a combination thereof.

In the photocatalysis process, the content of the metal particles of the metal supported metal oxide photocatalyst is in the range of 1 to 100% by weight.

In the photocatalysis process, the metal oxide of the metal particle supported metal oxide photocatalyst may include a typical supporting solid carbon product, main group metal and transition group metal oxides such as $Al_2O_3$, SiC, $SiO_2$, $TiO_2$, $ZrO_2$, MgO, a zeolite, clay, aerogel, perovskite, ilmentite, delafossite, and a combination thereof.

In the photocatalysis process, the light intensity may be in the range of 2-200 W $cm^{-2}$.

In the photocatalysis process, the light may be one of natural and simulated light.

In the photocatalysis process, the light wavelength may be from 200 nm to 2500 nm.

In the photocatalysis process, the light wavelength may include: (a) ultraviolet region from 200 nm to 405 nm within the mentioned intensities; (b) blue light region between 405 nm to 495 nm in the range of the mentioned intensities; (c) the visible and green region between 495 nm to 625 nm in the range of the mentioned intensities; and (d) the infrared region comprising the mentioned intensities between 625 nm to 2500 nm.

In the photocatalysis process, the saturated hydrocarbon may have a concentration in the range of 0.01-100% by volume to a balancing gas and the balance gas is one of He, $N_2$, Ne, Ar, Kr, Xe, or a combination thereof.

BRIEF DESCRIPTION OF THE DRAWINGS

Embodiments will now be described, by way of example only, with reference to the drawings, in which.

Figure 2A:
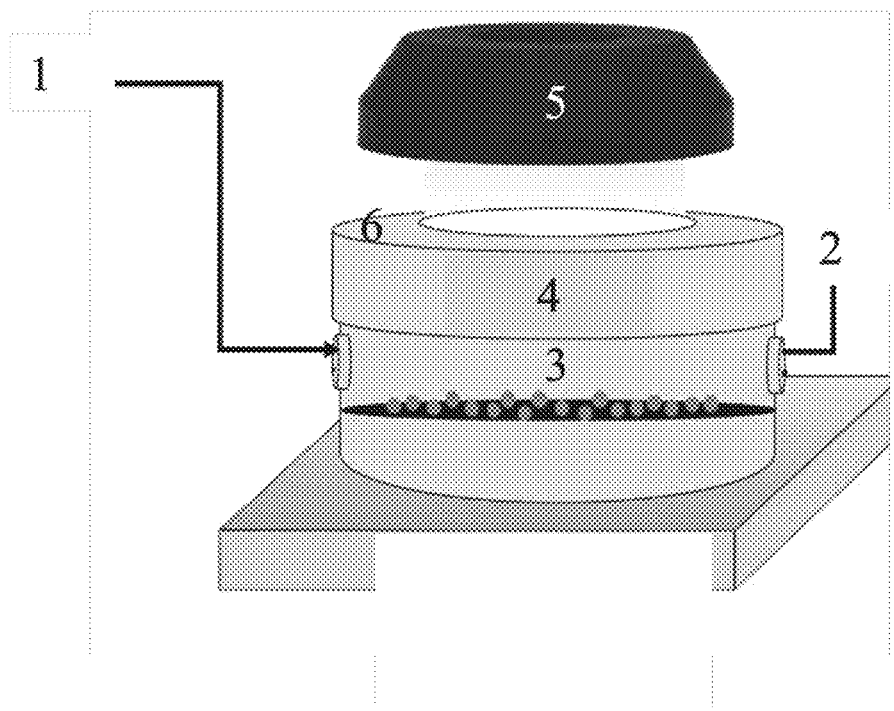
Figure 2B:
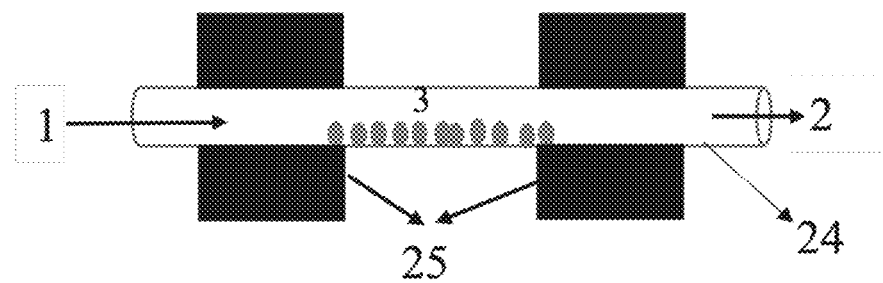
Figure 2C:
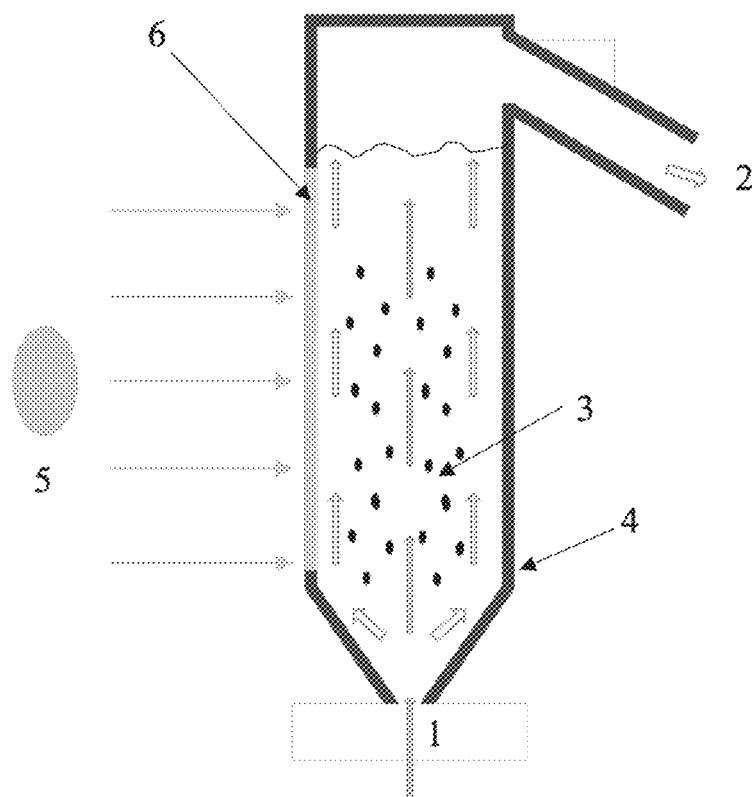
Figure 2D:
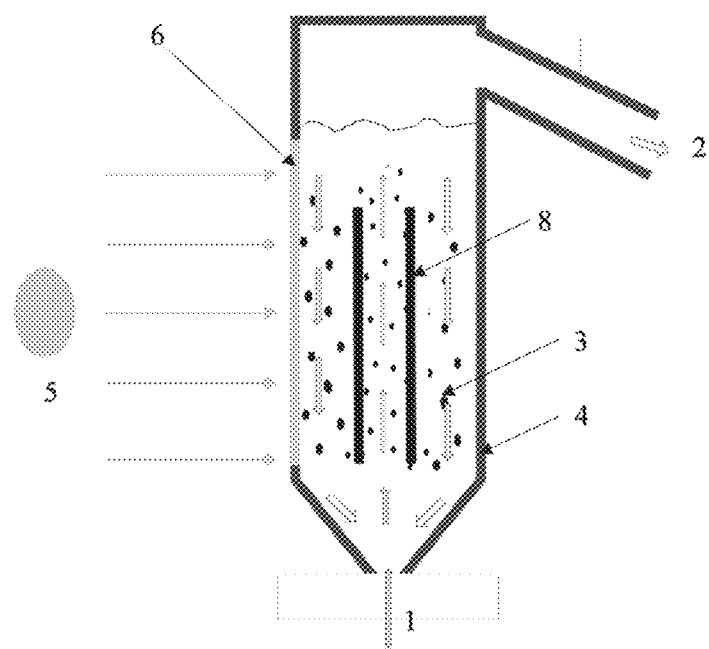
Figure 3A:
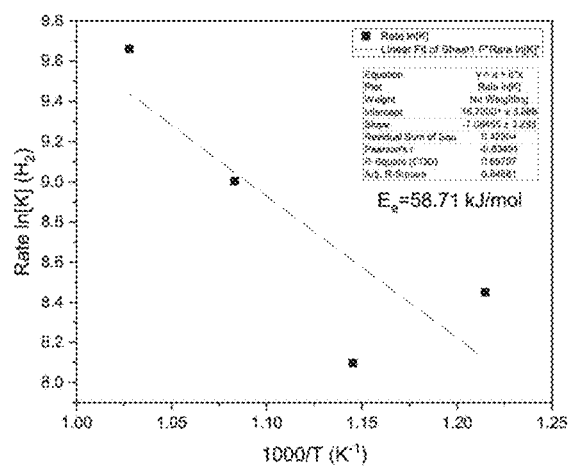
Figure 3B:
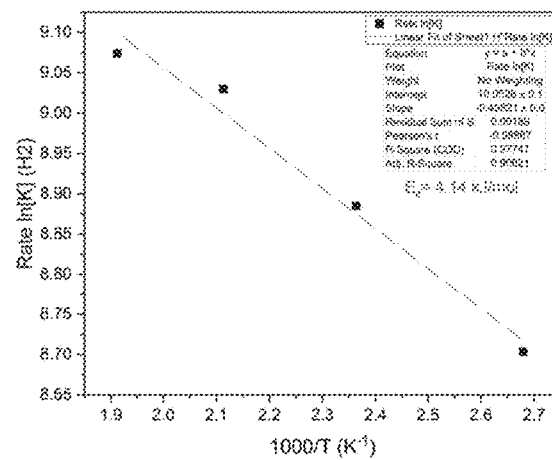
Figure 4:
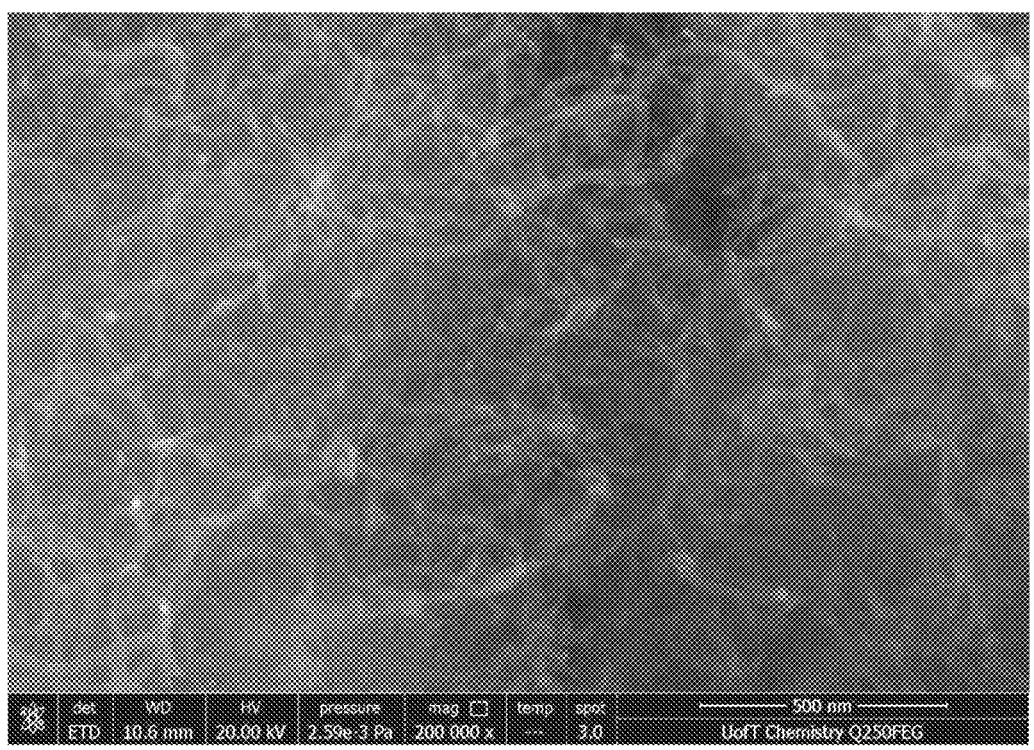
Figure 5A:
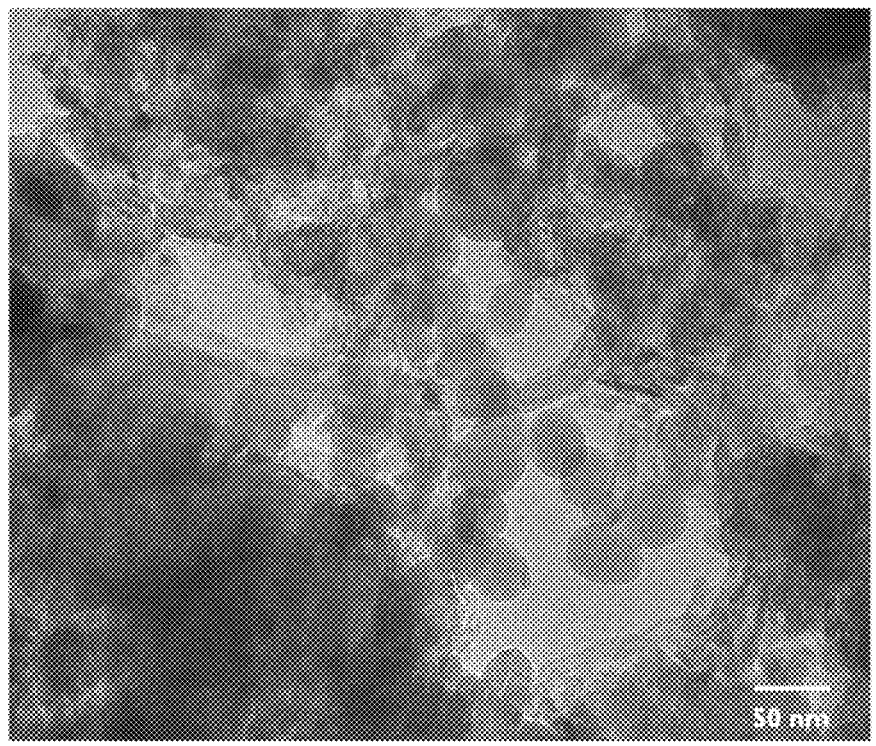
Figure 5B:
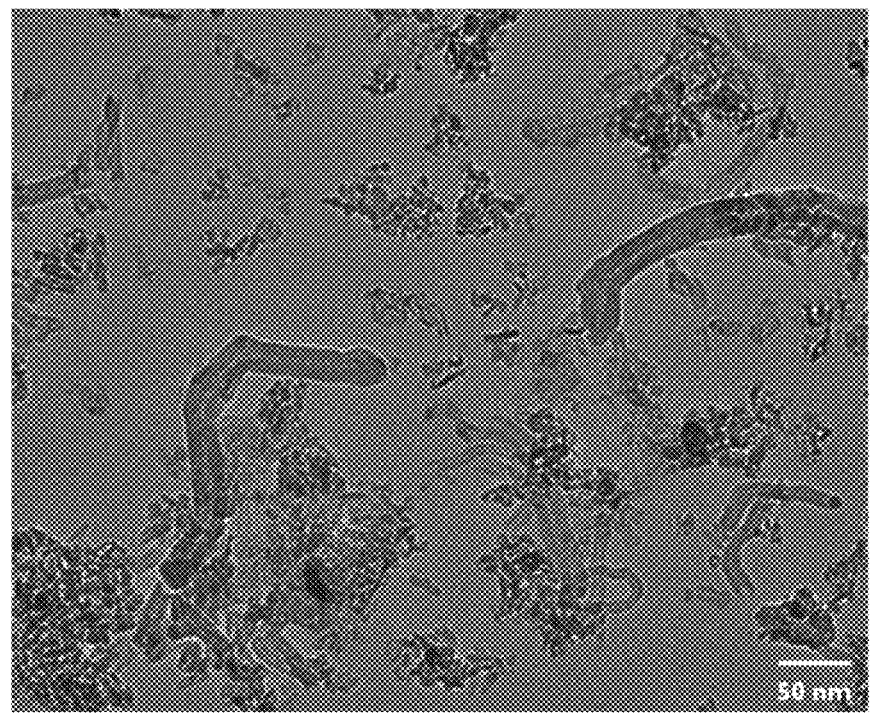
Figure 5C:
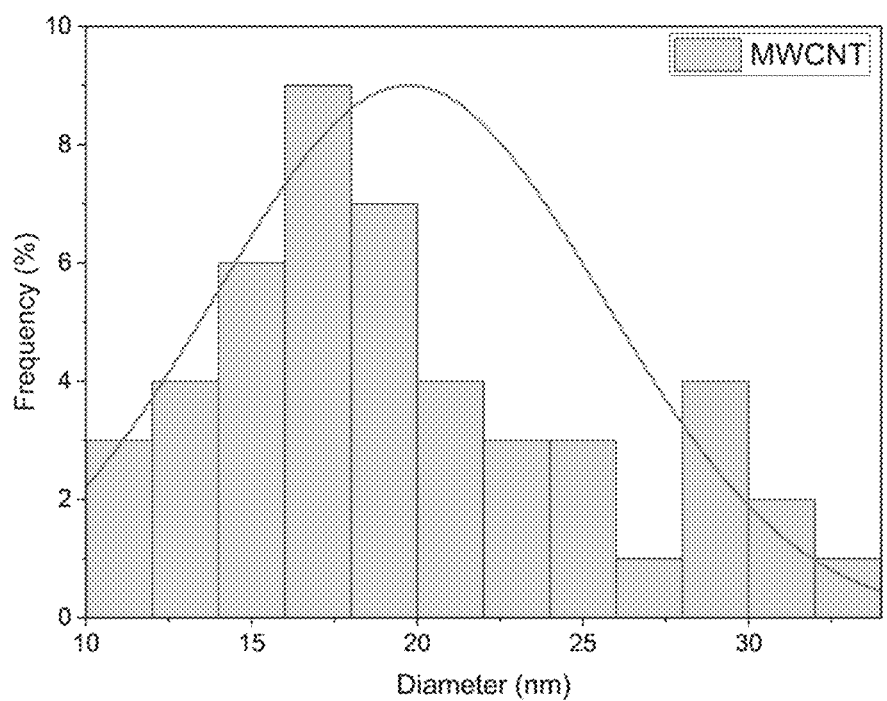
Figure 6A:
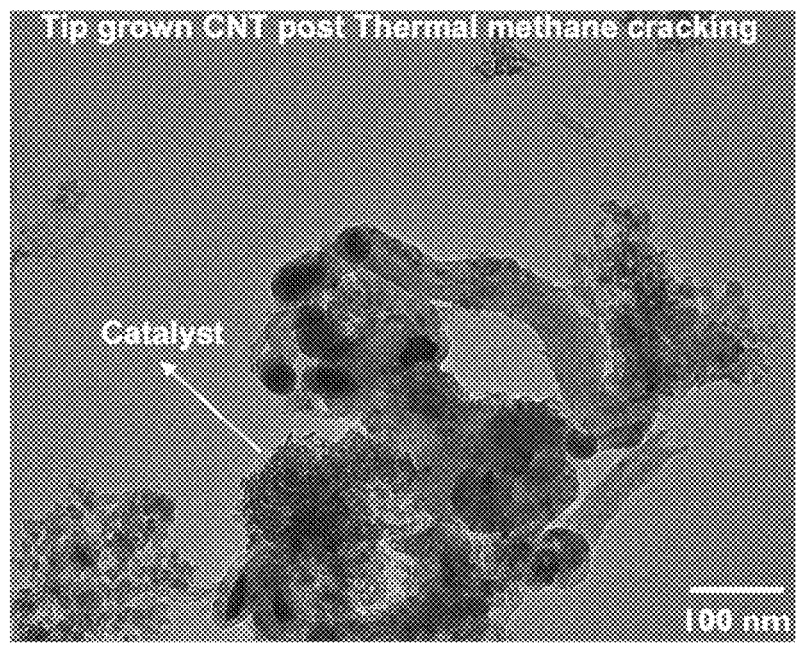
Figure 6B:
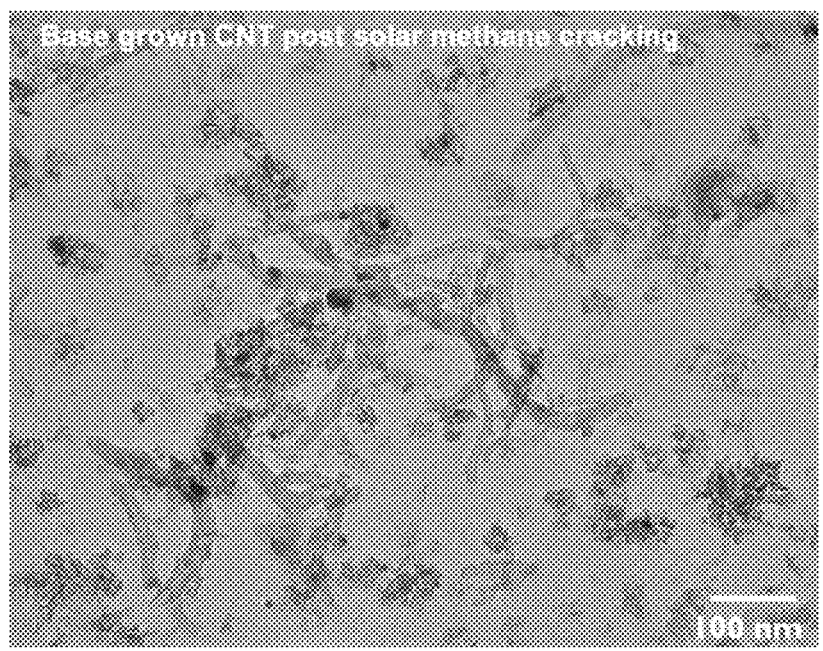
Figure 7A:
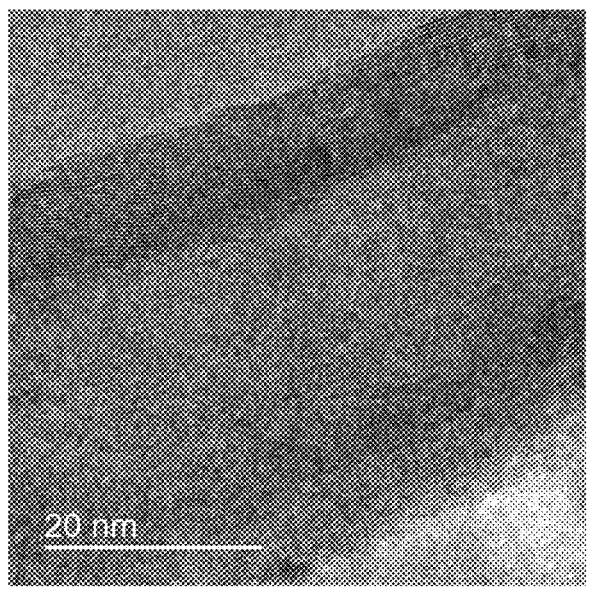
Figure 7B:
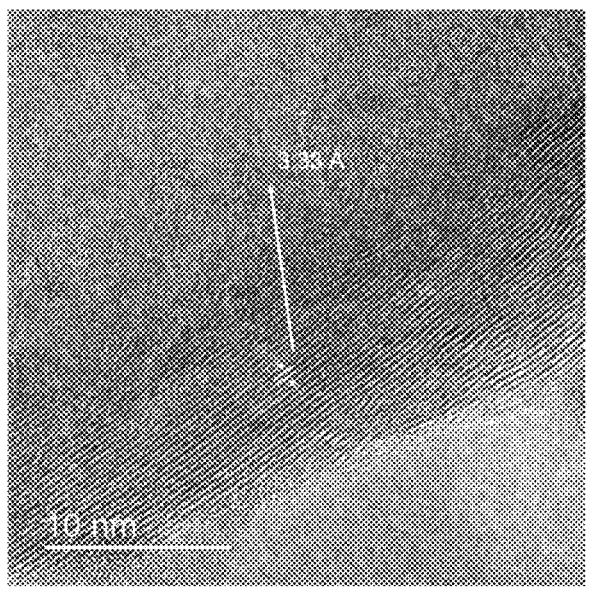
Figure 8A:
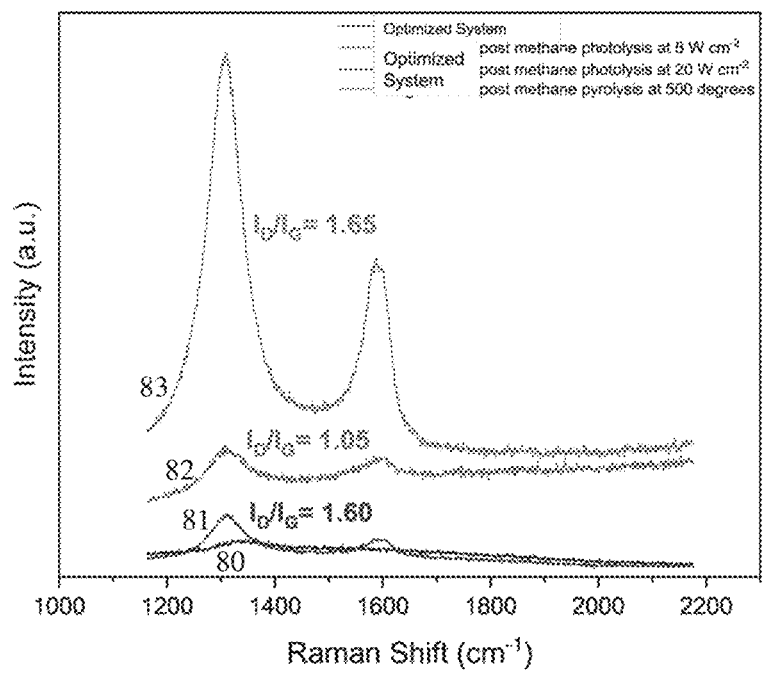
Figure 8B:
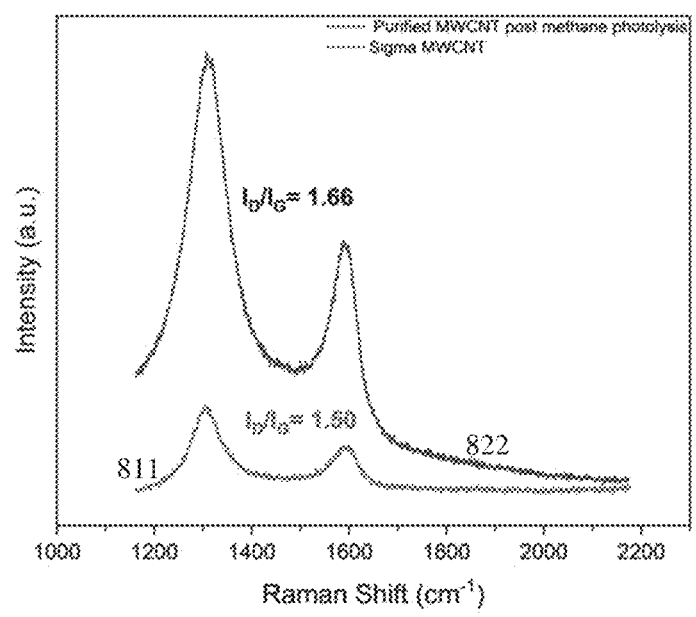
Figure 9:
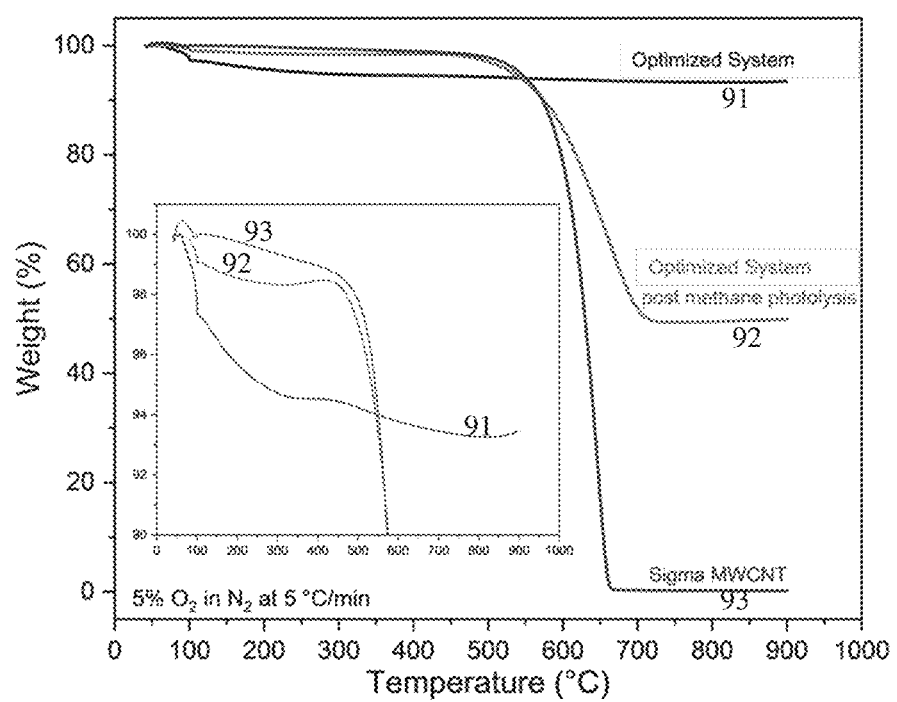
Figure 10:
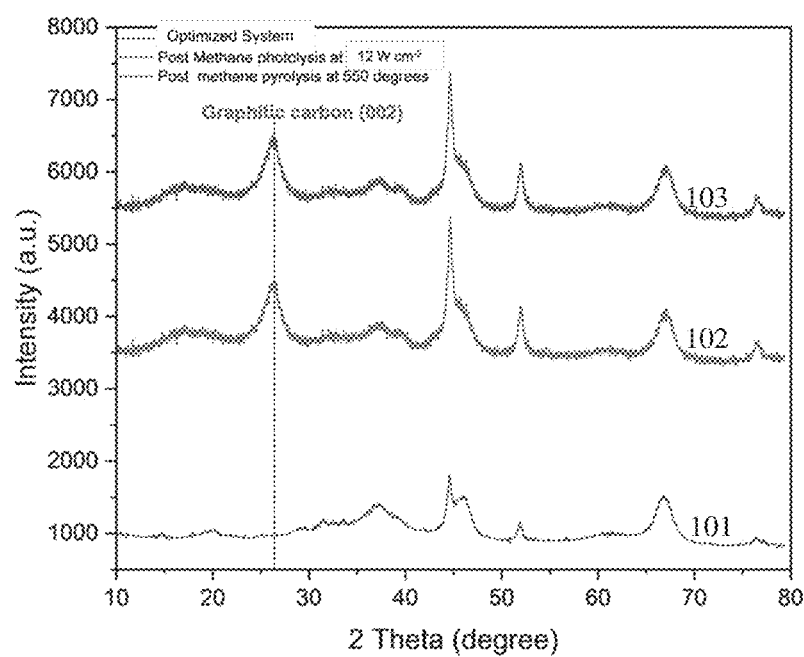
Figure 11A:
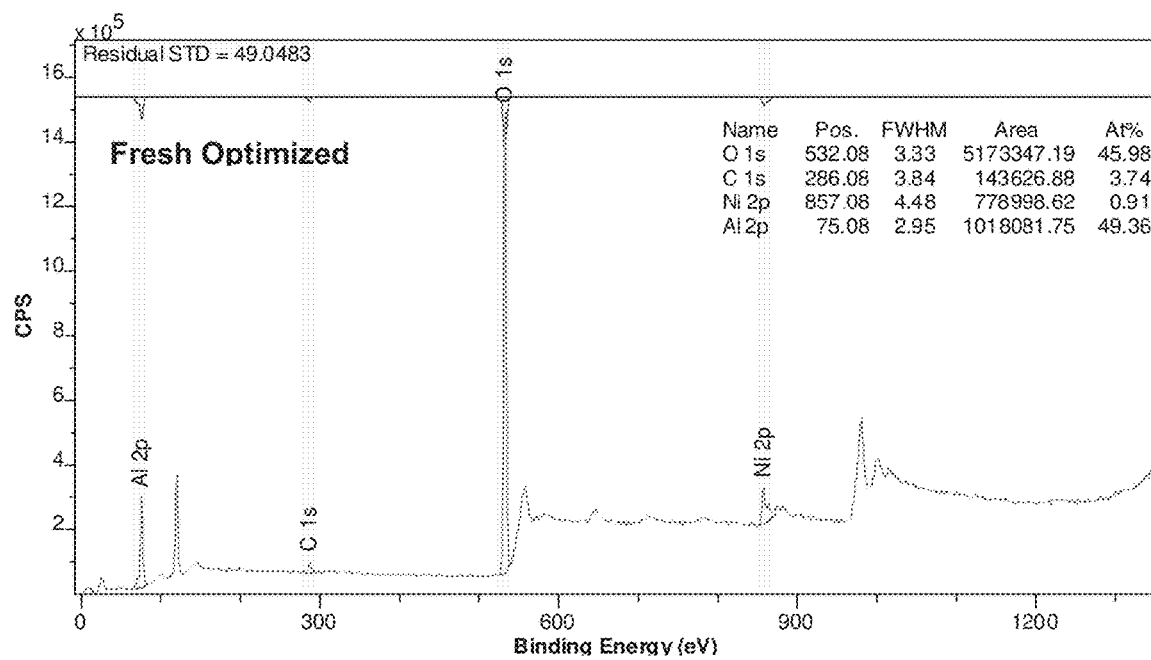
Figure 11B:
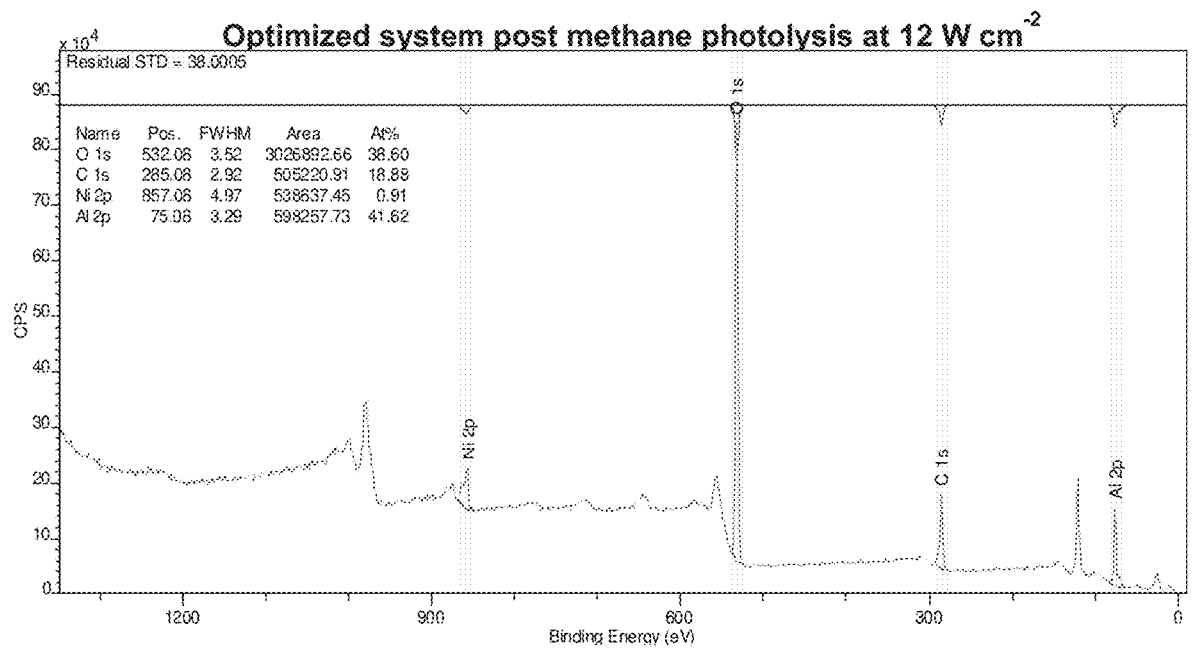
Figure 11C:
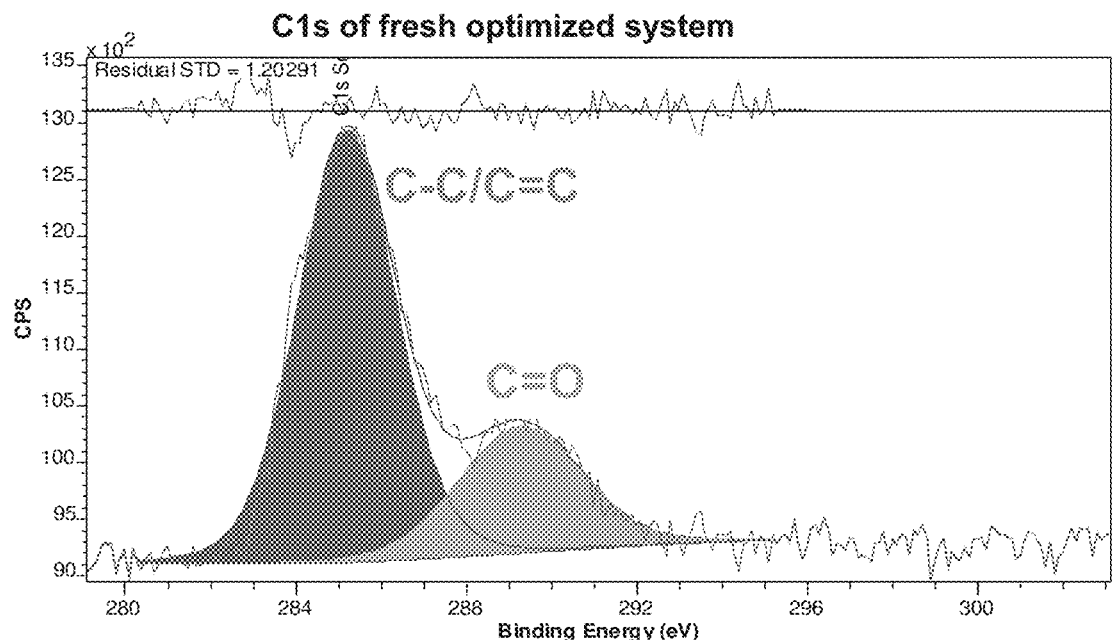
Figure 11D:
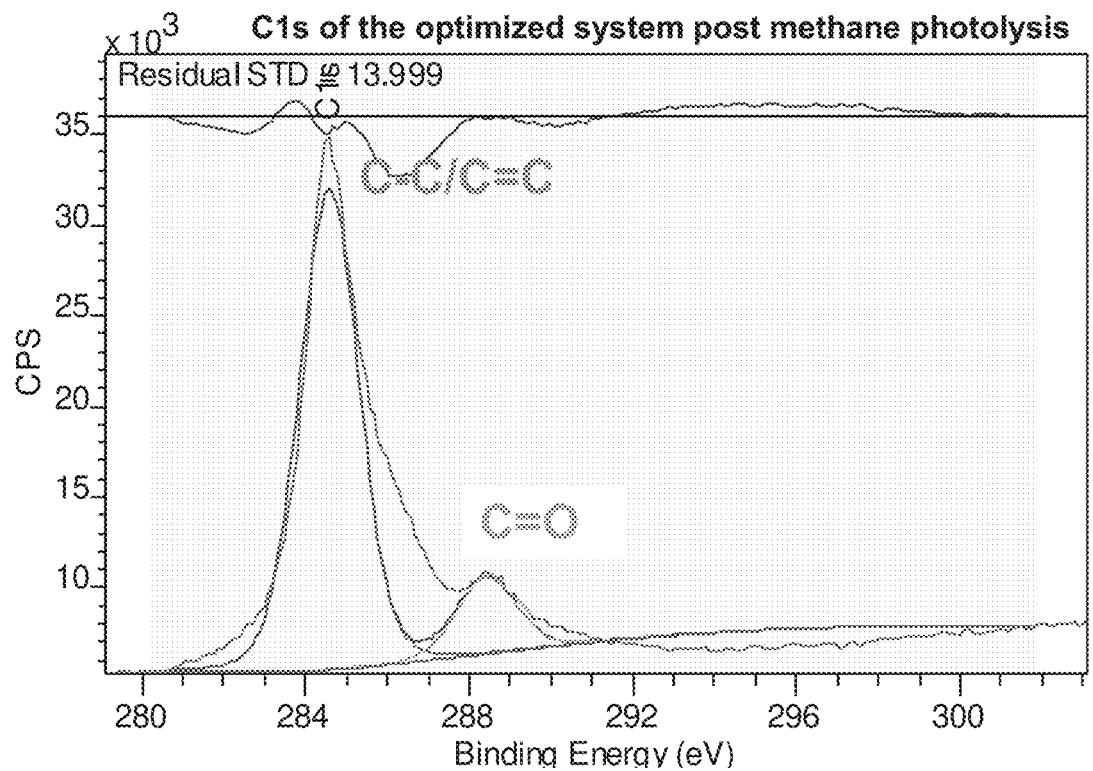
Figure 11E:
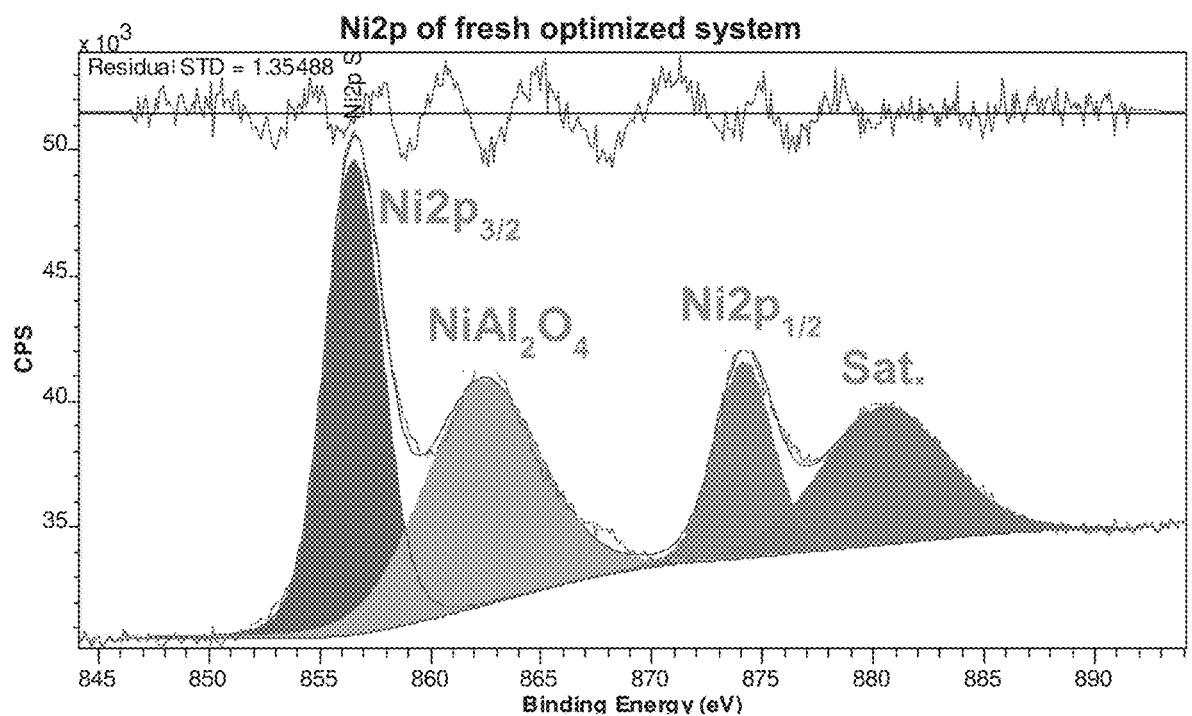
Figure 11F:
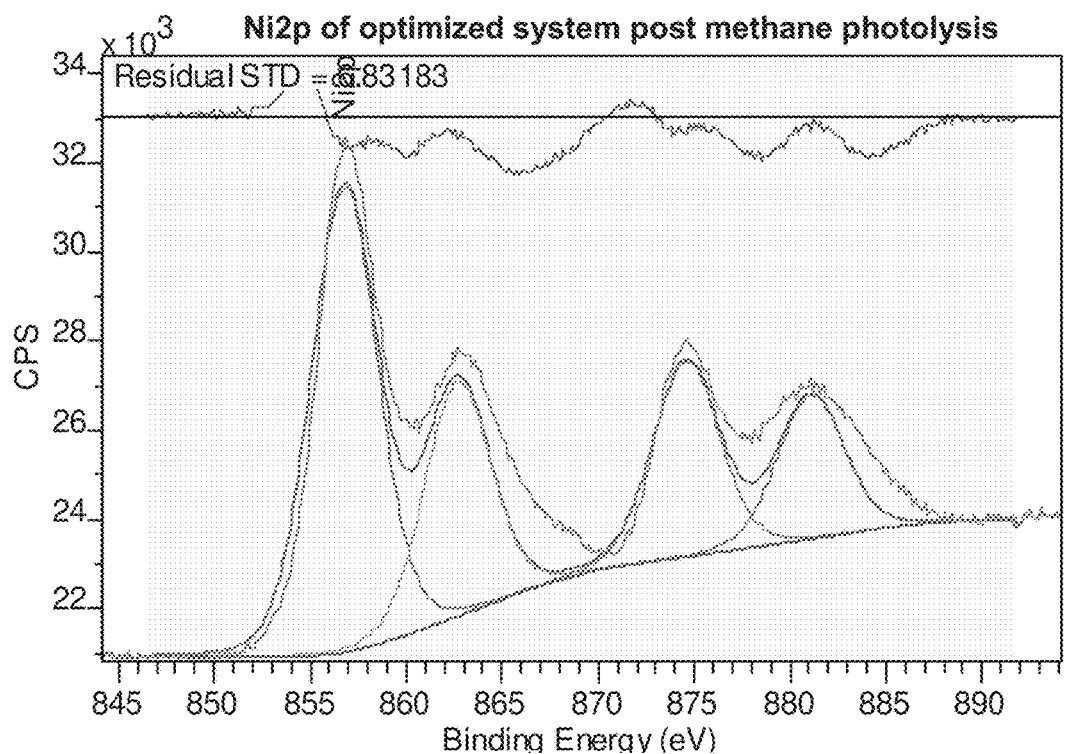
Figure 12A:
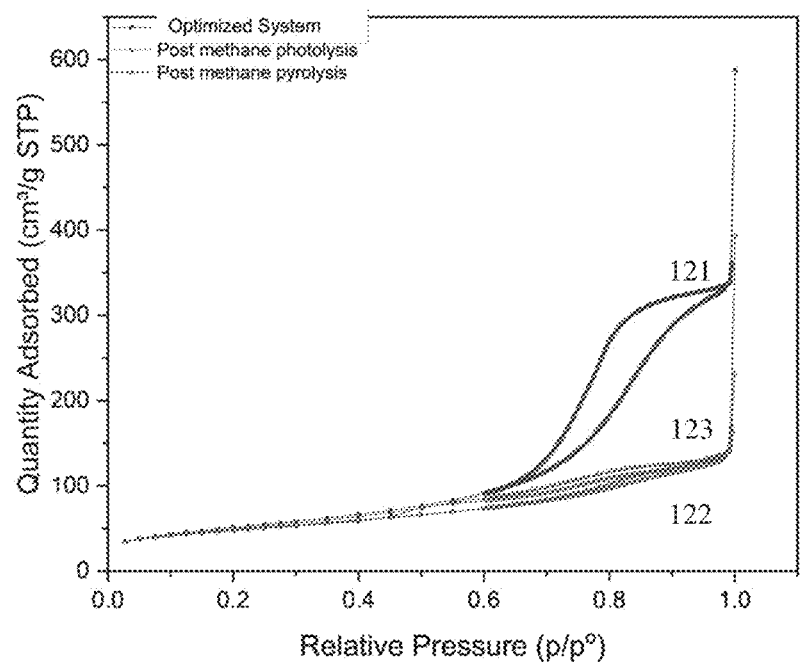
Figure 12B:
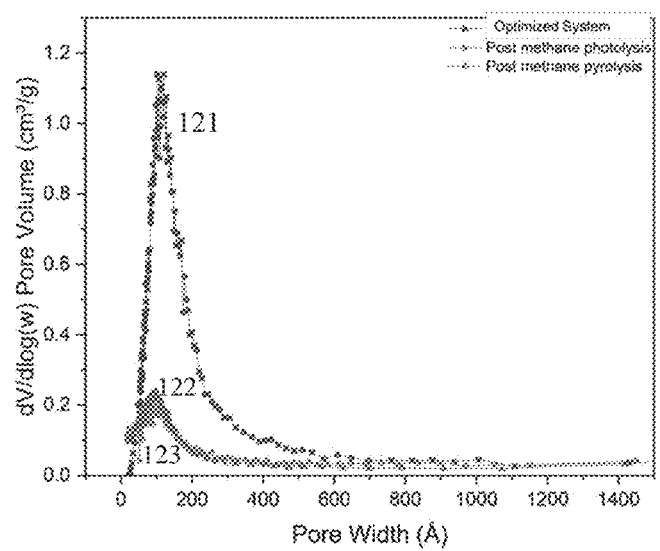

FIG. 2A illustrates a schematic of a horizontal fixed bed photoreactor for the solar catalytic methane decomposition described herein;

FIG. 2B illustrates a schematic of a horizontal quartz tubular reactor for the thermal catalytic methane decomposition described herein;

FIG. 2C illustrates a schematic of a vertical photo fluidized reactor for the solar catalytic methane decomposition described herein;

FIG. 2D illustrates a schematic of a vertical photo fluidized reactor similar to that shown in FIG. 2C but further including draft tubes;

FIG. 3A shows a representative apparent activation energy of the traditional thermal catalytic methane decomposition (pyrolysis at 550° C.);

FIG. 3B shows a representative apparent activation energy of the solar catalytic methane decomposition (photolysis) approach (12 W cm-2);

FIG. 4 shows a Scanning Electron Microscopy (SEM) image of the formed CNT post the solar catalytic methane decomposition (photolysis) approach (12 W cm$^{-2}$);

FIG. 5A shows Transmission Electron Microscopy (TEM) images of the formed carbon nanostructures (CNT and amorphous carbon) post the traditional thermal catalytic methane decomposition (pyrolysis) at 550° C.;

FIG. 5B shows Transmission Electron Microscopy (TEM) images of MWCNT formed post the solar catalytic methane decomposition (photolysis) approach (12 W cm$^{-2}$);

FIG. 5C shows the particle size distribution of the MWCNT formed post the solar catalytic methane decomposition (photolysis) approach (12 W cm$^{-2}$);

FIG. 6A shows TEM images of the formed tip-grown carbon nanotubes post the traditional thermal catalytic methane decomposition (pyrolysis) at 550° C.;

FIG. 6B shows TEM images of the formed base-grown carbon nanotubes post the solar catalytic methane decomposition (photolysis) approach (12 W cm-2) respectively;

FIG. 7A shows a 20 nm High Resolution Transmission Electron Microscopy (HRTEM) image of the MWCNT formed at different scale post the solar catalytic methane decomposition (photolysis) approach (12 W cm$^{-2}$);

FIG. 7B shows a 10 nm High Resolution Transmission Electron Microscopy (HRTEM) image of the MWCNT formed at different scale post the solar catalytic methane decomposition (photolysis) approach (12 W cm$^{-2}$);

FIG. 8A shows Raman spectra of the metal particle catalyst, the formed CNT on the catalyst post methane photolysis at different irradiance (8 and 20 W cm 2) and post methane pyrolysis at 550° C.;

FIG. 8B shows Raman spectra of the separated MWCNT from the catalyst post the methane photolysis and the commercial sigma MWCNT;

FIG. 9 shows Thermal gravimetric analysis (TGA) of the pristine metal particle catalyst, the formed MWCNT on the catalyst post methane photolysis at 12 W cm$^{-2}$ and the commercial sigma MWCNT. The inset figure is zoomed TGA in the 90-100 weight %;

FIG. 10 shows Powder X-ray diffraction (PXRD) patterns of the pristine metal particle catalyst, the formed CNT on the catalyst post methane photolysis at different irradiance (20 W cm$^{-2}$) and post methane pyrolysis at 550° C.;

FIG. 11A shows an X-ray photoelectron spectroscopy (XPS) survey scan of the pristine metal particle catalyst with inset of the identification and quantification of elements from survey scans;

FIG. 11B shows an X-ray photoelectron spectroscopy (XPS) survey scan of the catalyst post methane photolysis at irradiance (12 W cm$^{-2}$) with inset of the identification and quantification of elements from survey scans;

FIG. 11C shows C1s high resolution spectra of the pristine metal particle catalyst;

FIG. 11D shows C1s high resolution spectra of the catalyst post methane photolysis at irradiance (12 W cm$^{-2}$);

FIG. 11E shows Ni2p high resolution spectra of the pristine metal particle catalyst;

FIG. 11F shows Ni2p high resolution spectra of the catalyst post methane photolysis at irradiance (12 W cm$^{-2}$);

FIG. 12A shows N$_2$ adsorption-desorption isotherm of the pristine metal particle catalyst, the catalyst post methane photolysis (12 W cm$^{-2}$) and post methane pyrolysis (550° C.);

FIG. 12B shows N$_2$ pore-size distribution of the pristine metal particle catalyst, the catalyst post methane photolysis (12 W cm$^{-2}$) and post methane pyrolysis (550° C.)

Figure 13A:
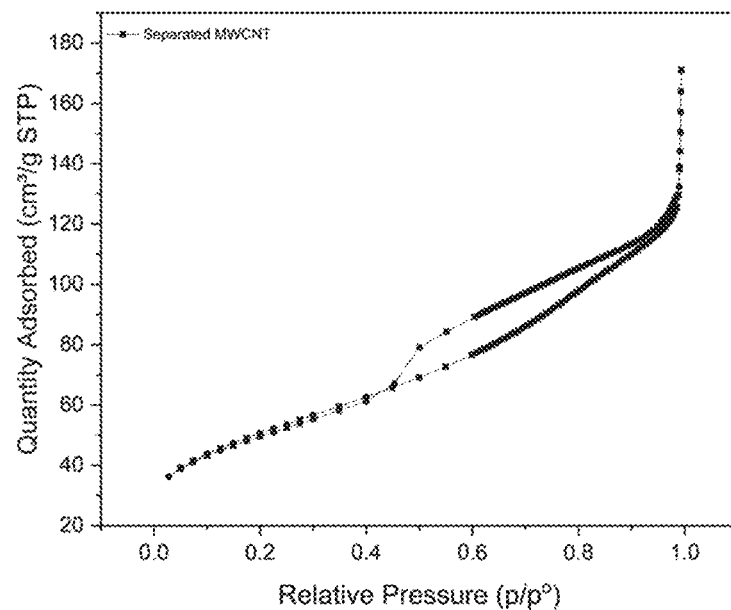
Figure 13B:
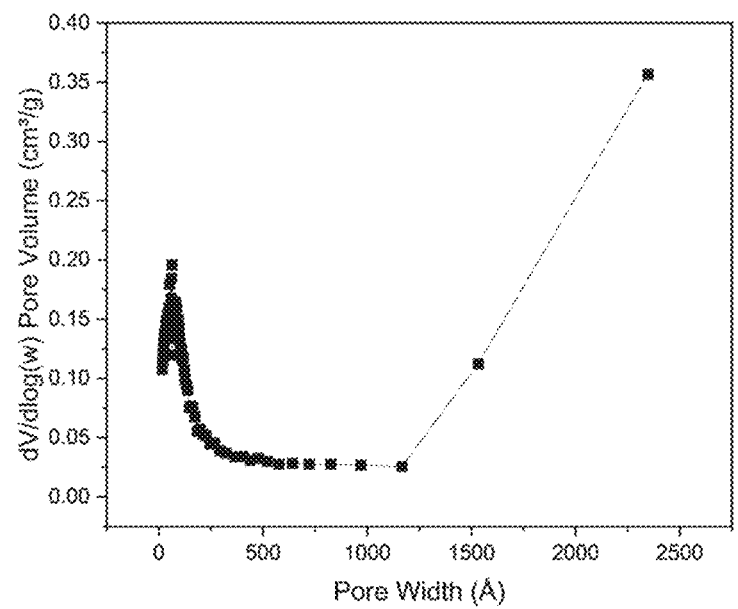
Figure 15A:
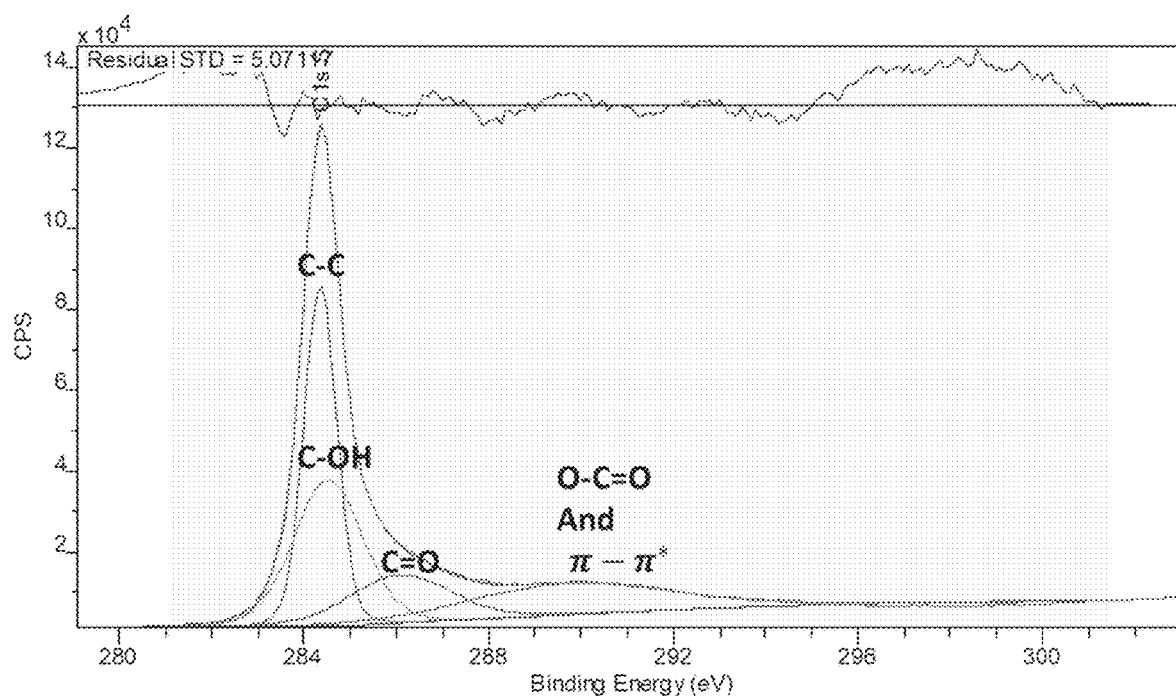
Figure 15B:
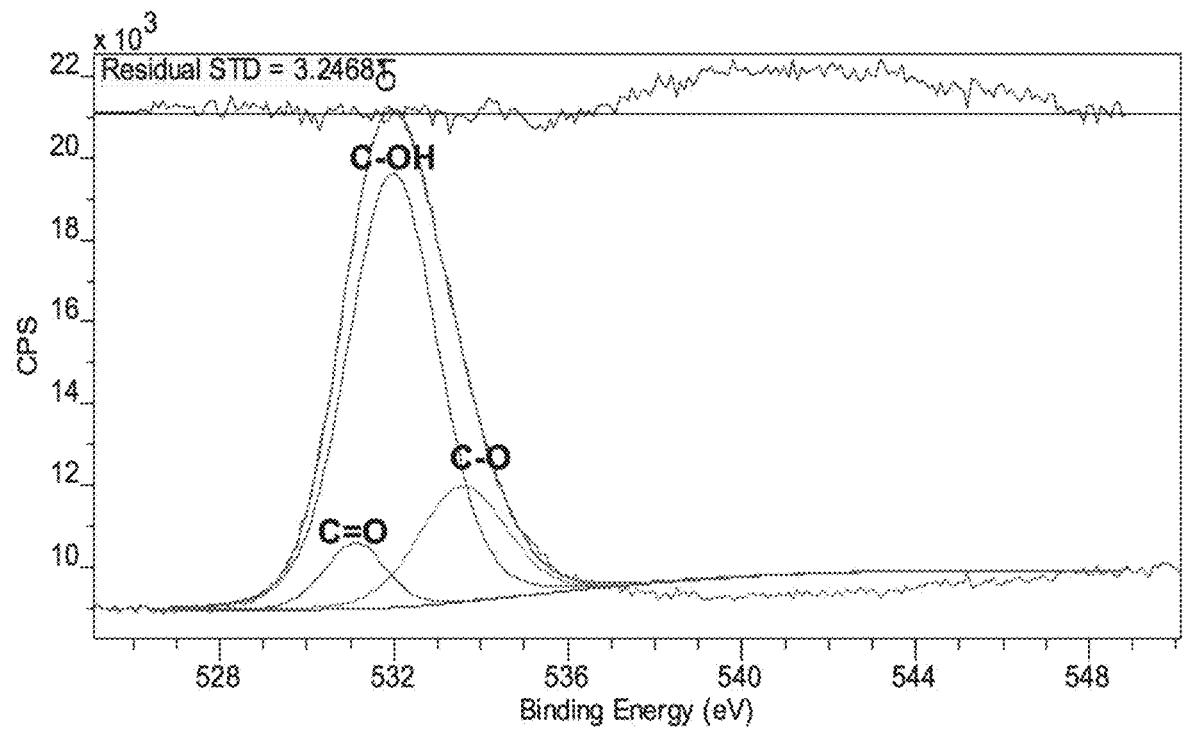
Figure 16:
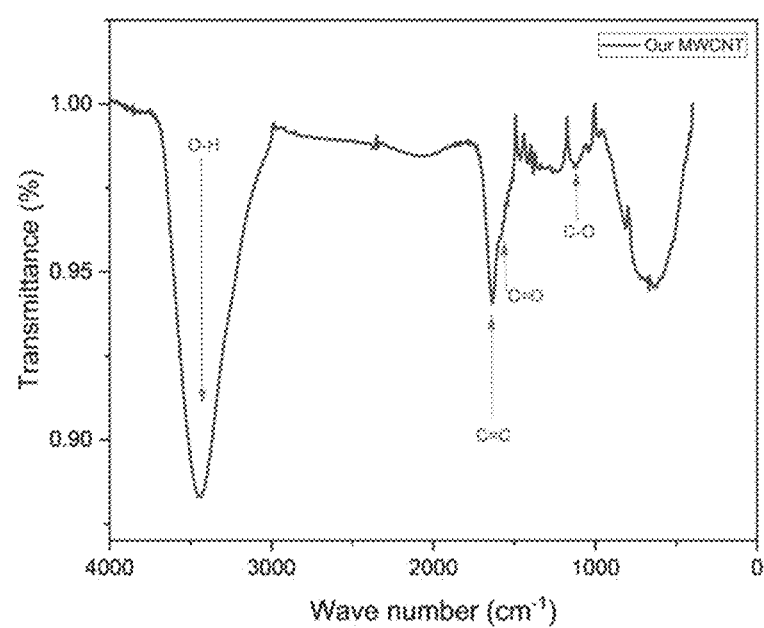
Figure 17:
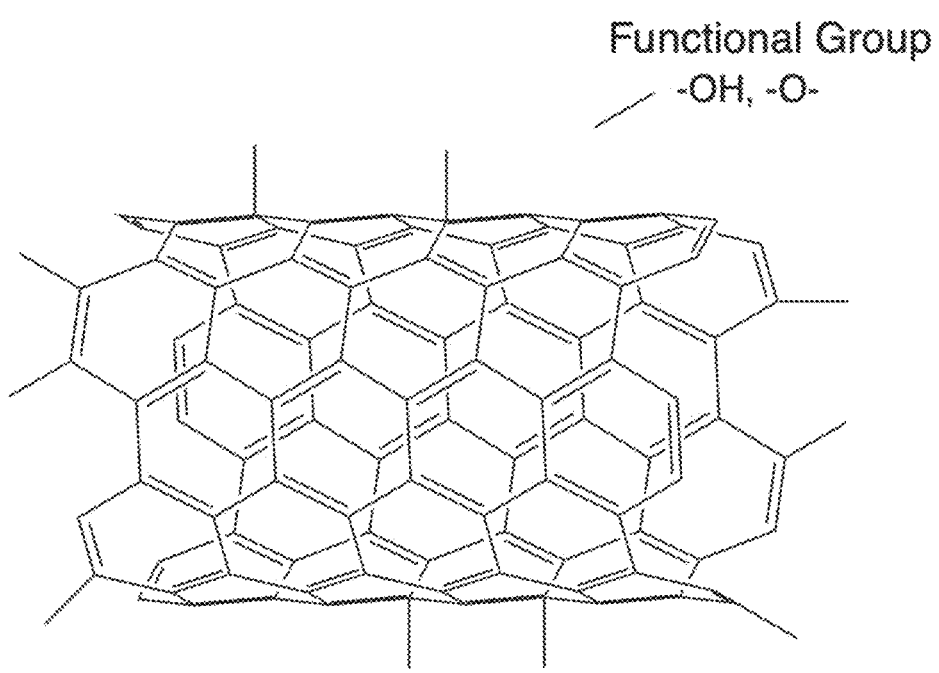
Figure 18A:
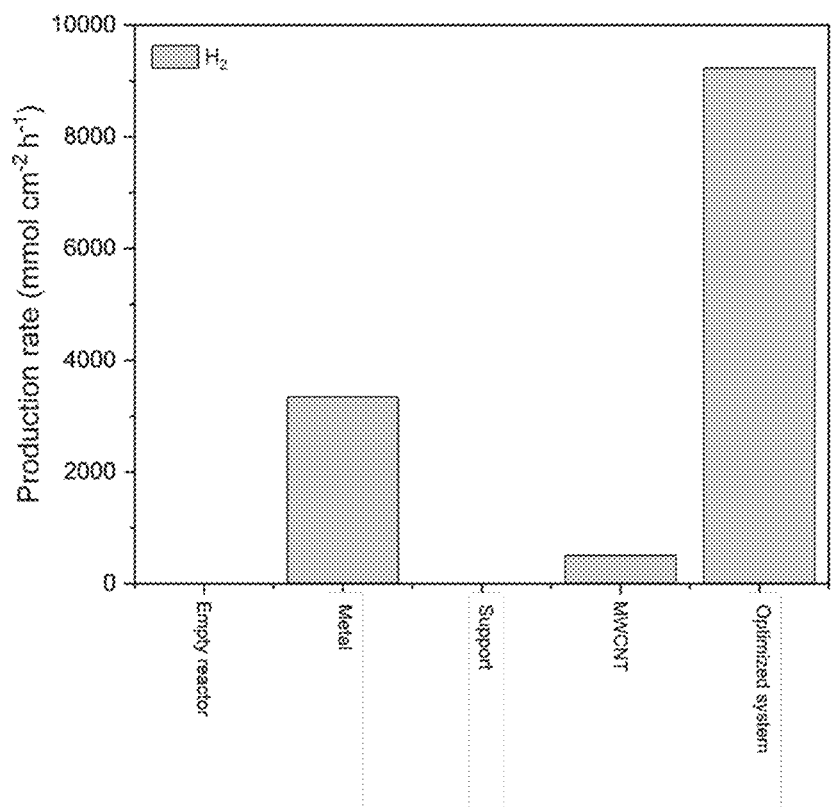
Figure 18B:
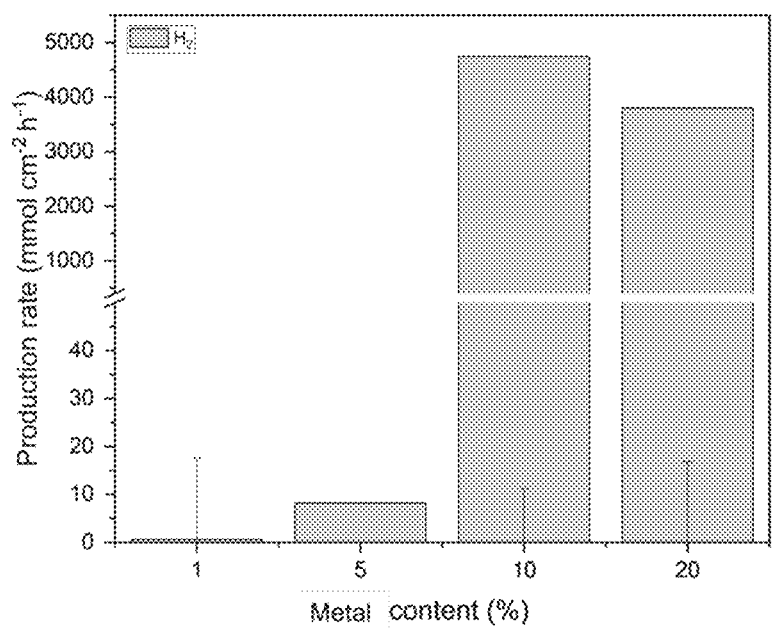
Figure 19:
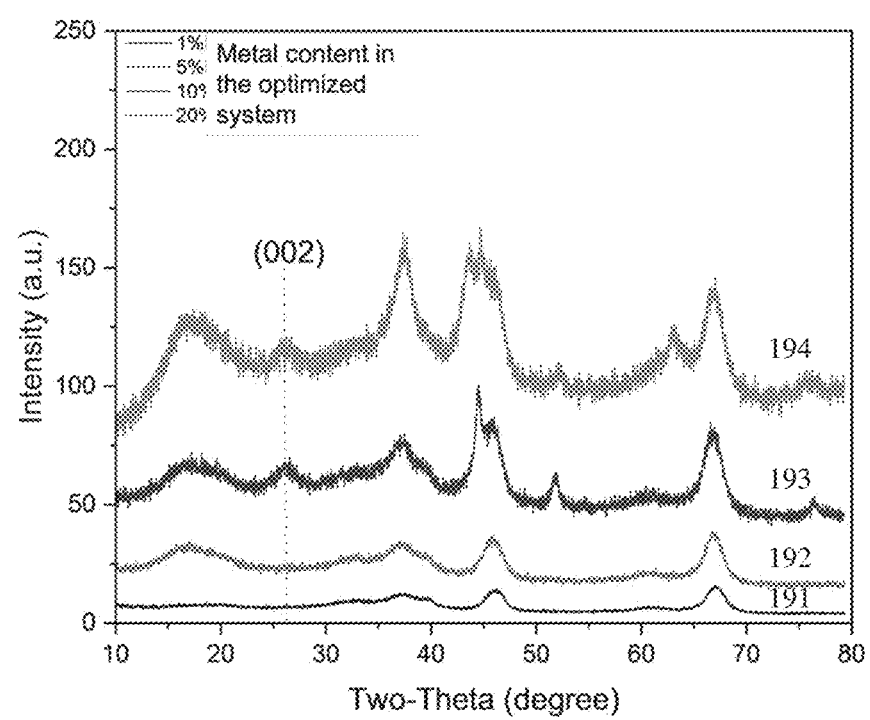
Figure 20:
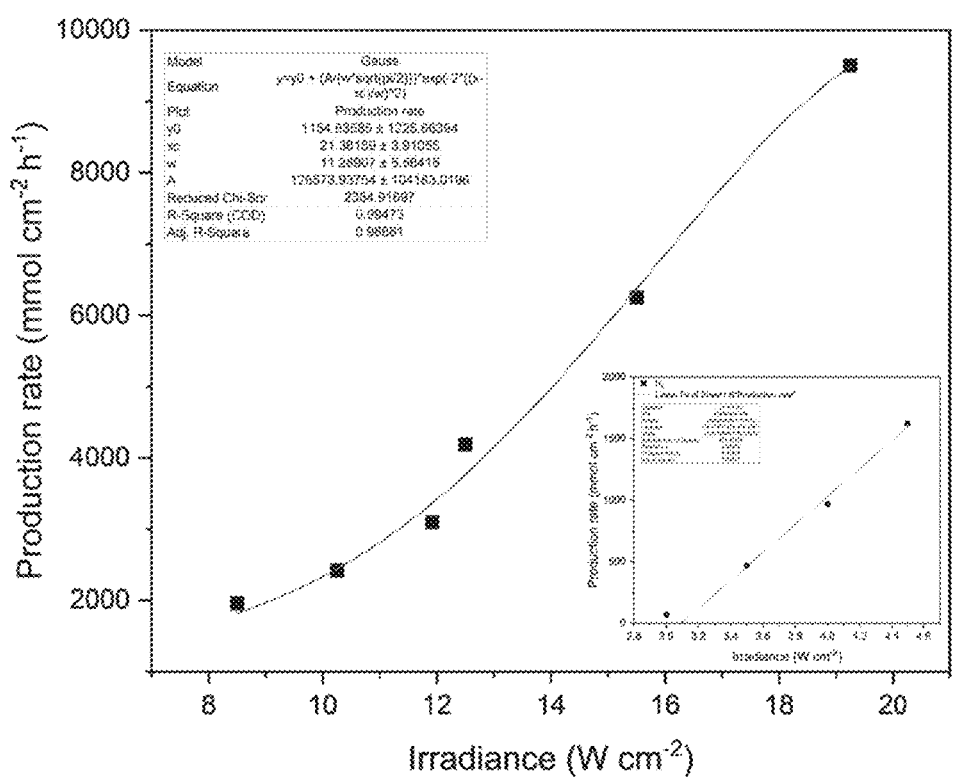
Figure 21A:
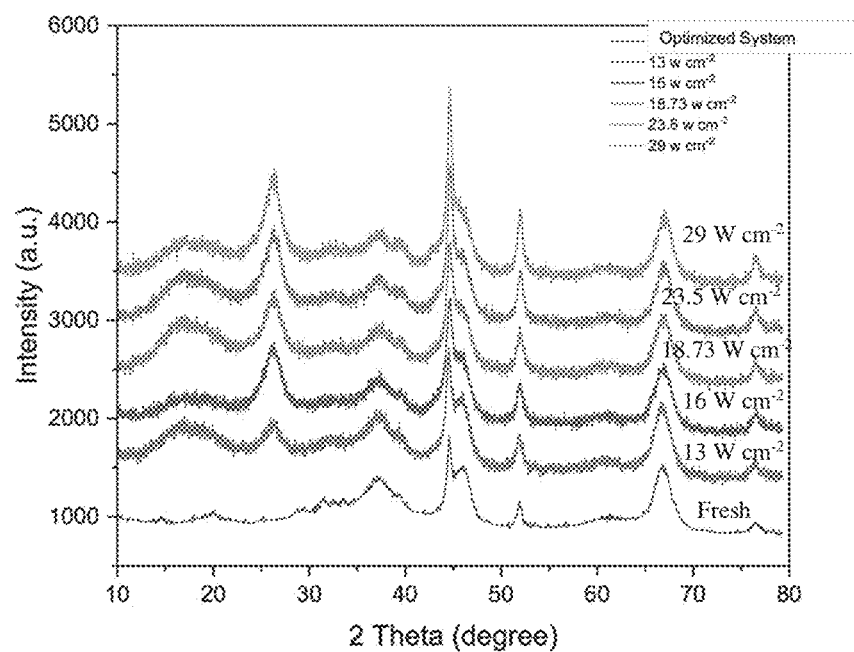
Figure 21B:
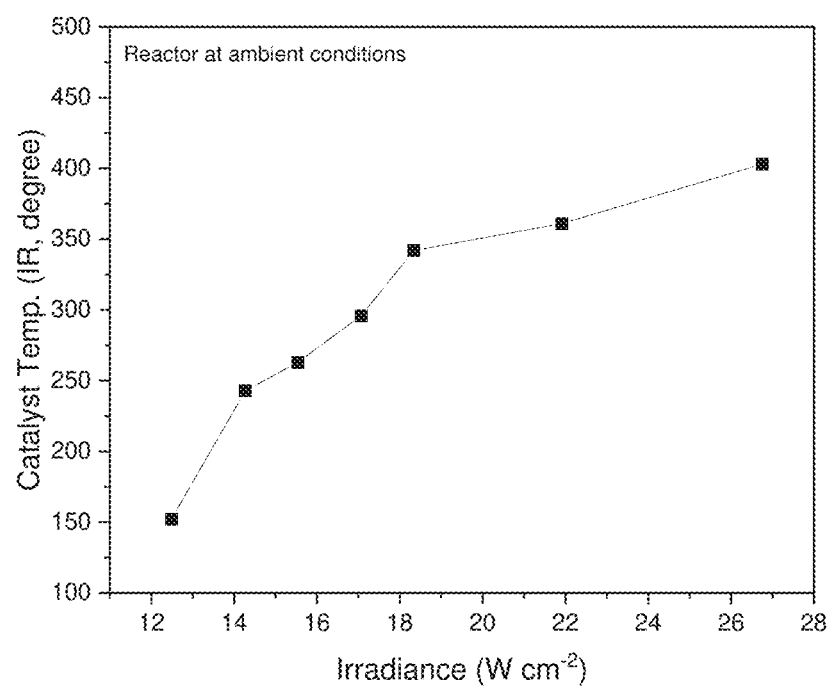
Figure 22A:
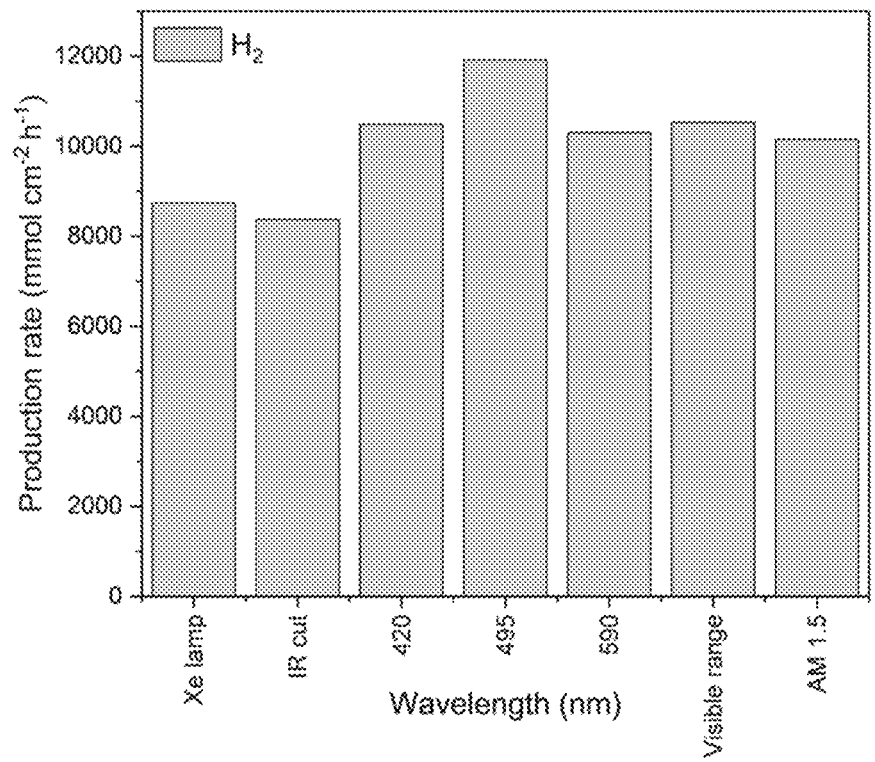
Figure 22B:
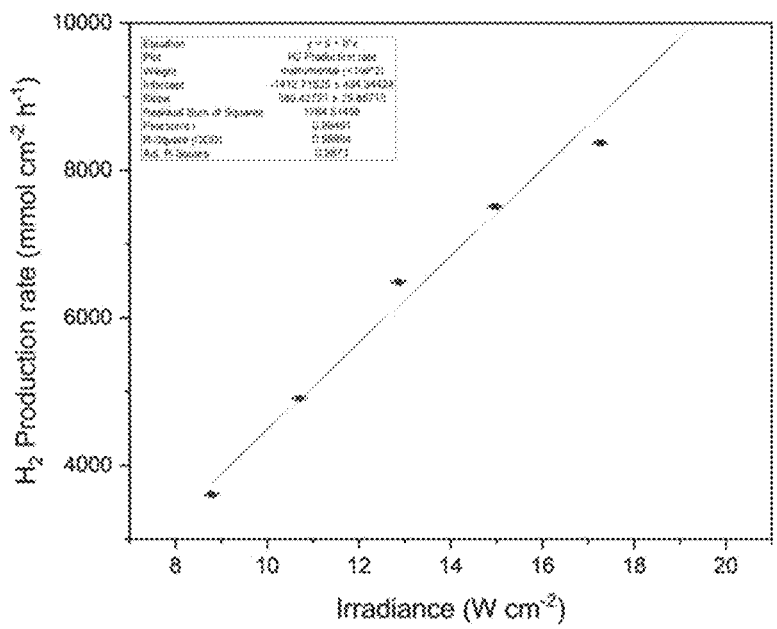
Figure 23:
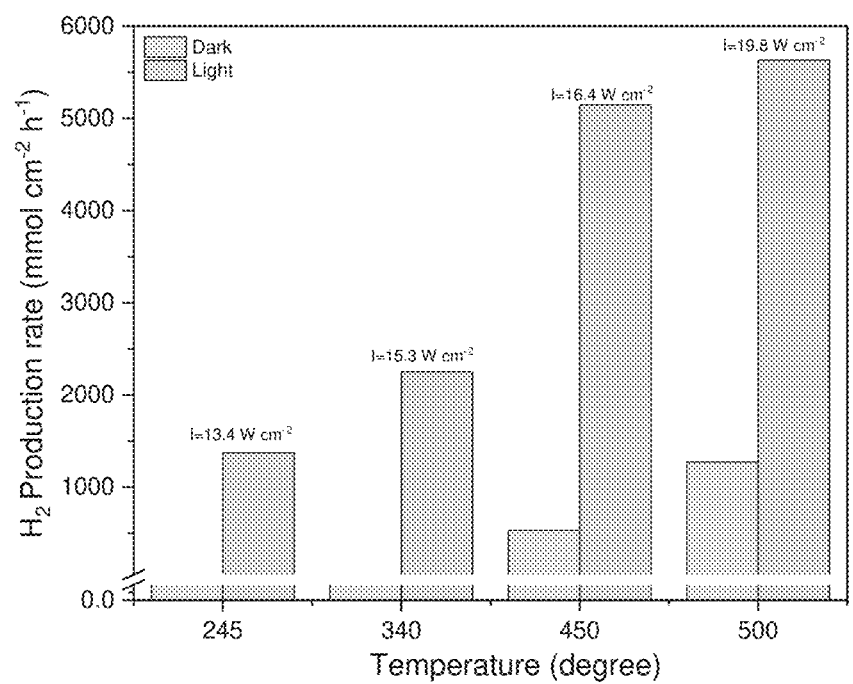
Figure 24A:
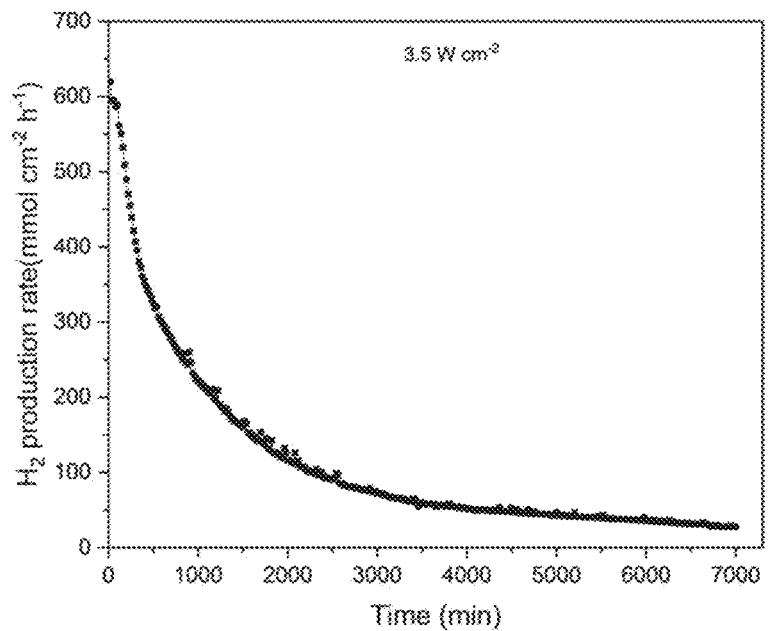
Figure 24B:
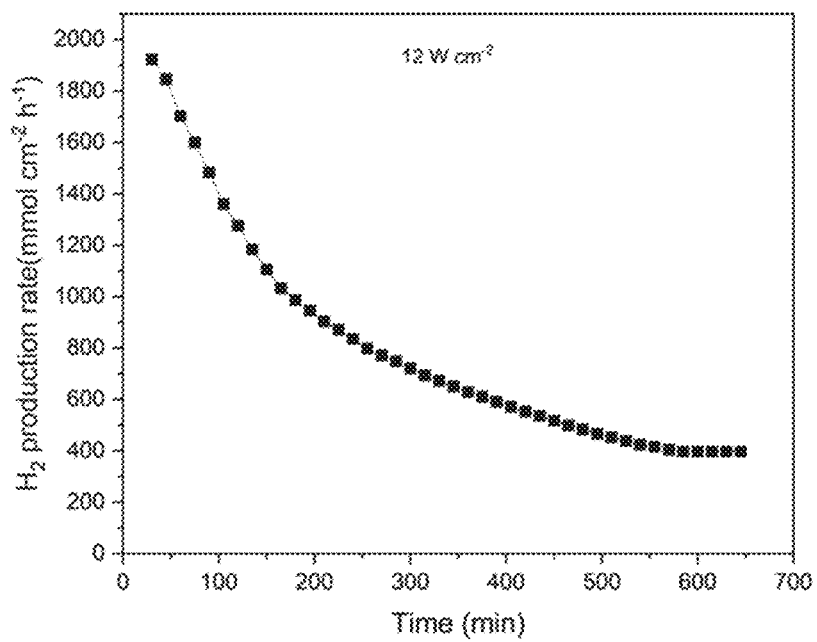
Figure 24C:
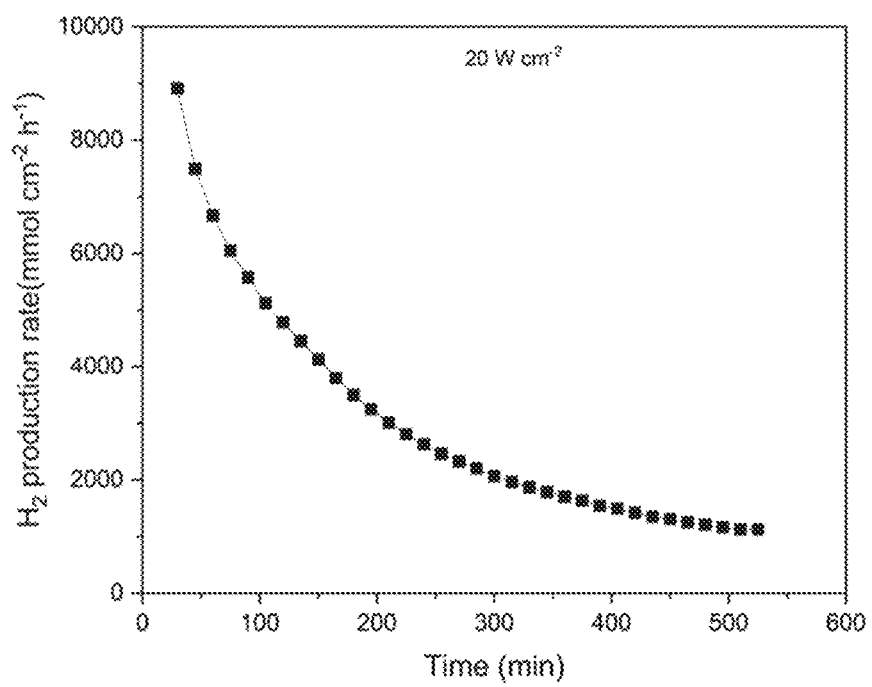
Figure 25:
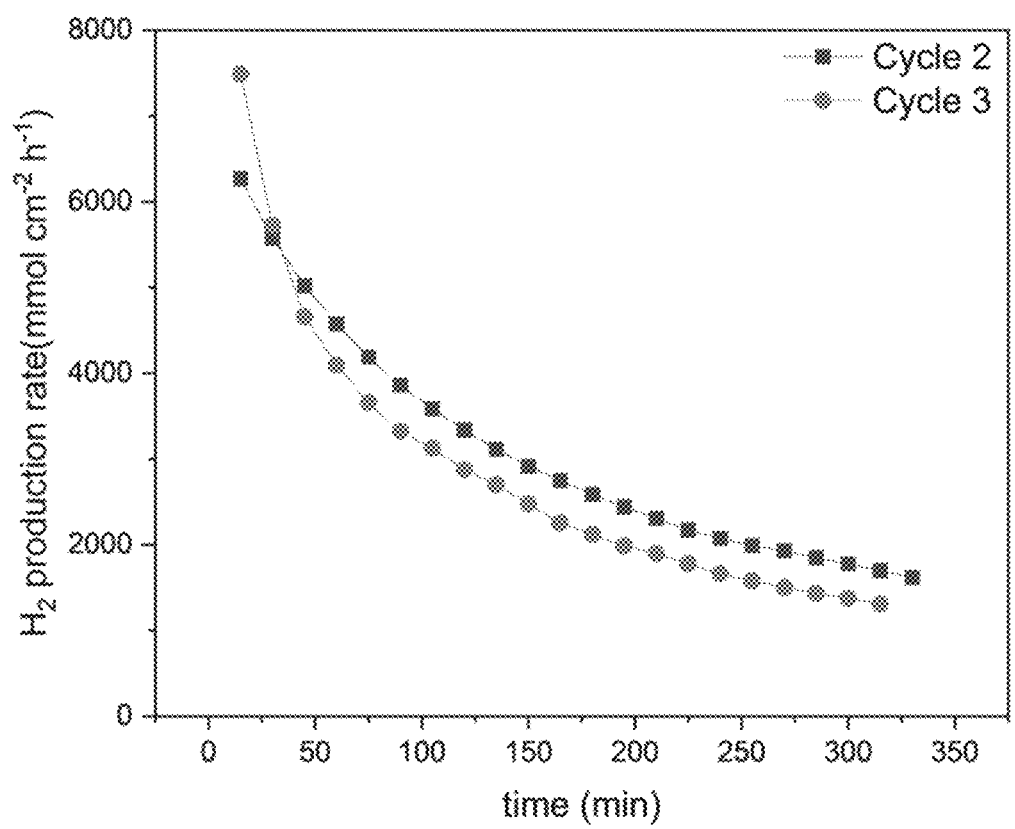
Figure 26A:
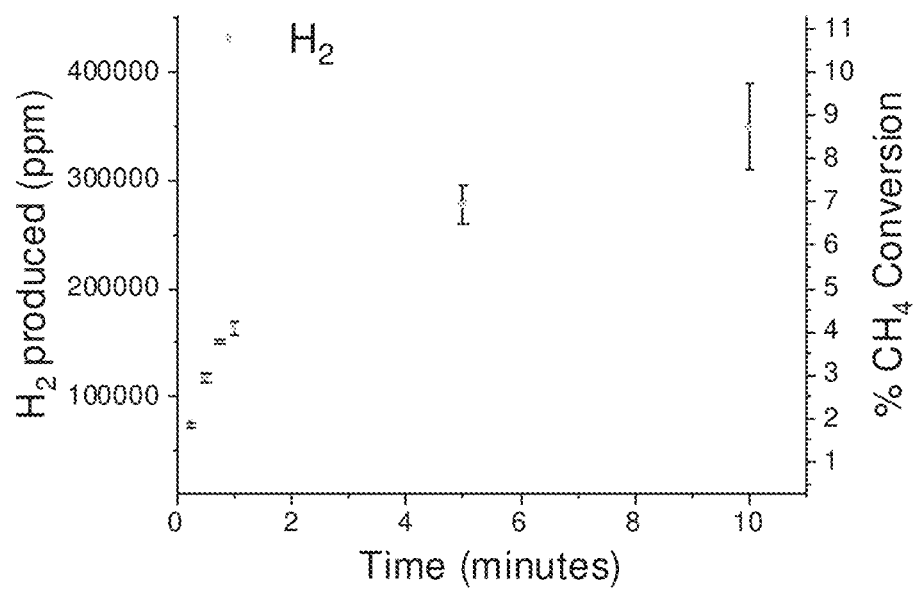
Figure 26B:
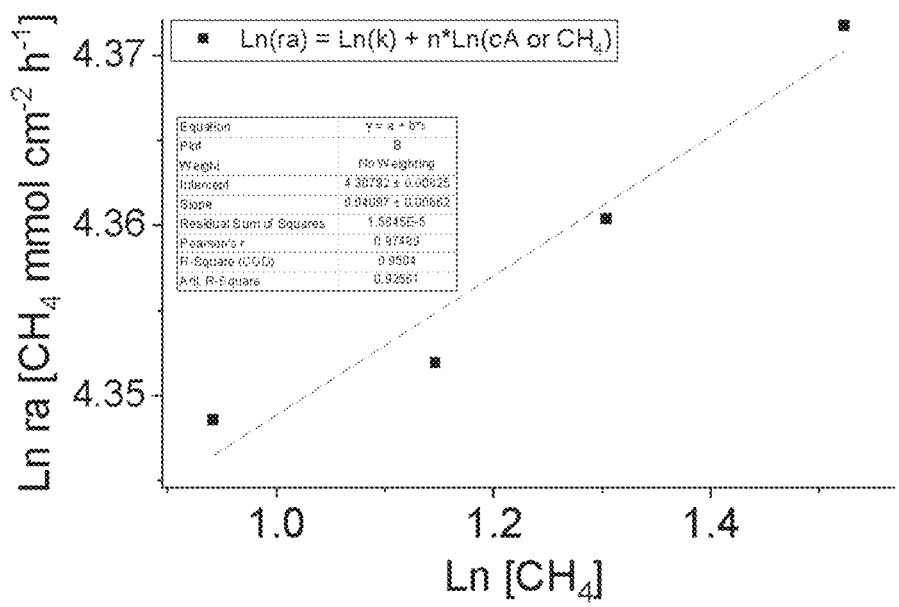

FIG. 13A shows N$_2$ adsorption-desorption isotherm of the mechanically separated MWCNT post methane photolysis (12 W cm$^{-2}$);

FIG. 13B shows N$_2$ pore-size distribution of the mechanically separated MWCNT post methane photolysis (12 W cm$^{-2}$);

FIG. 14 shows a table of the texture Properties of fresh, spent metal particle catalyst and mechanically separated MWCNT extracted from Brunauer-Emmett-Teller (BET) Surface Area Analysis and Barrett-Joyner-Halenda (BJH) Pore Size and Volume Analysis;

FIG. 15A shows the high resolution C1s XPS spectra of the mechanically separated O-MWCNT (oxygen surface functionalized multiwalled carbon nanotubes);

FIG. 15B shows the high resolution O1s XPS spectra of the mechanically separated O-MWCNT;

FIG. 16 shows the Fourier transform infrared (FTIR) spectra of the mechanically separated O-MWCNT;

FIG. 17 illustrates a schematic representation of the mechanically separated O-MWCNT;

FIG. 18A shows the H$_2$ production rate of each component of the catalyst at irradiance power (20 W cm$^{-2}$);

FIG. 18B shows the H$_2$ production rate of the catalyst of different metal % at irradiance power (20 W cm$^{-2}$);

FIG. 19 shows PXRD patterns of the catalyst of different metal %, post methane photolysis at irradiance power (20 W cm$^2$);

FIG. 20 show the H$_2$ production rate over the metal particle catalyst at different irradiance (8-20 W cm 2). The inset figure is the H$_2$ production rate over the catalyst at the minimum solar irradiance (3-4.5 W cm$^2$);

FIG. 21A shows PXRD patterns of the catalyst post methane photolysis at different irradiance;

FIG. 21B shows the surface temperature of the metal particle catalyst recorded using IR camera during the methane photolysis at different irradiance;

FIG. 22A shows the wavelength dependence studies at irradiance (20 W cm$^2$);

FIG. 22B shows the H$_2$ production rate over the metal particle catalyst at different irradiance (8-20 W cm 2) using 495 nm filter;

FIG. 23 shows the $H_2$ rate over the metal particle catalyst in dark and heated to the corresponding temperature caused by solar light of different irradiance w.r.t the rates under solar light;

FIG. 24A shows the change of the $H_2$ rate over the metal particle catalyst with time at 3.5 W cm$^{-2}$ irradiance;

FIG. 24B shows the change of the $H_2$ rate over the metal particle catalyst with time at 12 W cm$^{-2}$ irradiance;

FIG. 24C shows the change of the $H_2$ rate over the metal particle catalyst with time at 20 W cm 2 irradiance;

FIG. 25 shows the cycles of the $H_2$ rate over the metal particle catalyst under solar irradiance (20 W cm$^{-2}$) after catalyst regeneration through mixing the metal particle catalyst with the separated MWCNT;

FIG. 26A shows the $CH_4$ conversion experiment for the methane photolysis reaction over the metal particle catalyst, where the Xe lamp light intensity was set to 11 W cm 2 in batch conditions, average pressure each test=14.6 psi, Reactor volume=16.8 mL;

FIG. 26B shows the kinetic experiment for the methane photolysis reaction over the metal particle catalyst, where the Xe lamp light intensity was set to 11 W cm$^{-2}$ in batch conditions, average pressure each test=14.6 psi, reactor volume=16.8 mL.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the term "about" is meant to cover variations that may exist in the upper and lower limits of the ranges of values, such as variations in properties, parameters, and dimensions. Unless otherwise specified, the terms "about" mean plus or minus 25 percent or less.

As used herein, the term "free" is used to describe the produced hydrogen as $CO_x$-free hydrogen: "$CO_x$-free" and "$CO_x$" free refer to processes and methods that produce less than 0.1 ppm of carbon dioxide, carbon monoxide, or related compounds as by-products. The term "free" is used herein as well to describe the MWCNT as MWCNT free of amorphous carbon: free refer to processes and methods that produce less than 0.1 ppm of amorphous carbon, and "amorphous carbon" is reactive carbon lacking a crystalline structure, although it may be stabilized. The methods and processes disclosed herein, can be fine-tuned to favor the production of MWCNT over amorphous carbon. In one aspect, thermal catalytic decomposition of methane may produce some amount of amorphous carbon compared to the methods and processes disclosed herein.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

The present disclosure reports carbon dioxide and carbon monoxide $CO_x$-free hydrogen ($H_2$) and oxygen surface functionalized multiwalled carbon nanotubes (O-MWCNT) without any treatment as co-products via methane decomposition over catalysts comprising metal particle supported metal oxide photocatalyst using solar radiation at ambient conditions. The highly selective simultaneous co-production of two industrially demanding compounds is efficient, self-sustaining, and environmentally benign compared to the traditional thermal method that requires very high temperature (600-1200° C.) and lacks high $H_2$ yield and MWCNT selectivity.

The renewable solar approach described herein features performance metrics with nearly 100% selectivity for $H_2$ and solid O-MWCNT. The latter, can be separated, purified, and used in further applications (e.g., energy storage devices, electronics, polymer composites, catalysis, nanotechnology, etc). To improve the technoeconomic of the process, the same MWCNT can be used as a support, offering a large surface area. A vertical reactor design may be used to maximize the yield of MWCNT using light. In yet another way, the catalyst can be regenerated and supported by the solid MWCNT. Solar conversion of methane as greenhouse waste to solid MWCNT and $H_2$, then to a $CO_x$-free electricity grid via a fuel cell, has potential economic and environmental benefits.

Hydrogen ($H_2$) is a well-known clean energy carrier for its potential to replace traditional combustion engine systems, potentially reducing emissions especially in the transportation and industry energy sector. Solar energy presents a sustainable route for clean $H_2$ production as it utilizes renewable sources to produce clean fuel. Natural gas (its main component is methane) is the primary source for $H_2$ production owing to its abundance, infrastructure availability and possessing one of the largest H/C ratios compared to other hydrocarbons.

Annually, natural gas and biogas yield approximately 140 billion cubic meters of easily obtainable methane. This offers a promising opportunity for environmentally conscious industries seeking to reduce their energy consumption and carbon emissions during the multi-step process of converting methane to hydrogen in refineries, such as steam methane reforming.

In the United States, there is a massive amount of natural gas resources that go to waste every year due to pipeline transportation limitations and fluctuations in production rates, with a capacity of over 200 billion cubic feet per year or ton/year. This problem is not exclusive to the United States, as stranded gas resources all over the world—including flare gas, refinery off gas, shale gas, and coal-bed methane—are often left untapped due to the high cost of pipelines. However, there is a solution: converting these non-value gases into carbon nanomaterials and COx-free H2 can have significant economic and environmental benefits, as they can be used as fuel or to produce electricity.

There are three main routes to produce $H_2$ from natural gas: steam methane reforming (SMR), methane cracking, and dry methane reforming. SMR is the current commercially used method for $H_2$ production using metal-based catalysts. While the process has favorable economics and is widely used, it requires a significant amount of energy (up to 900° C. or higher) and generates large quantities of greenhouse gas emissions, mainly carbon dioxide. As a result, it is not the most sustainable option available. In addition, it often generates low-value by-products, including low-quality carbon black and non-crystalline carbon. It also has a short life span as the catalyst deactivates through coke formation and sintering over time due to the extreme reaction conditions.

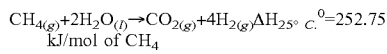
$CH_{4(g)}+2H_2O_{(l)} \rightarrow CO_{2(g)}+4H_{2(g)} \Delta H_{25° C.}^{0}=252.75$ kJ/mol of $CH_4$ On the other hand, methane pyrolysis provides a more sustainable $H_2$ production approach, as there are no GHG emissions during this process. Moreover, it generates low value carbon materials as a co-product used in several other industries, such as inks, tires, electronics and plastics. This product, when marketed, can improve the technoeconomic process. It is among the most cost-effective short-term solutions to low-$CO_x$ $H_2$ production and can be considered a bridge technology toward a sustainable future.

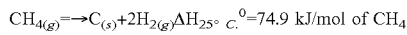
$CH_{4(g)} \rightarrow C_{(s)}+2H_{2(g)} \Delta H_{25° C.}^{0}=74.9$ kJ/mol of $CH_4$ SMR requires (63.3 KJ/mol of $H_2$) whereas methane cracking requires (37.8 KJ/mol of $H_2$). With these advantages in mind, the thermal decomposition of methane (>1200° C.) to $H_2$ is still not an environmentally viable option owing to the high energy required and carbon emissions if the process is not powered by renewable forms of energy. Herein, an efficient and scalable methane cracking technology is shown utilizing solar energy as the primary energy input source over metal-based catalysts.

The present disclosure comprises a novel approach to co-producing $CO_x$-free hydrogen and high-quality oxygen surface functionalized multiwalled carbon nanotubes over metal supported metal oxide photocatalysts using solar light. The example herein shows that the thermochemical methane pyrolysis process operating in the temperature range (600-1200° C.) can be replaced with a solar-powered process operating under ambient conditions according to the following reaction equation:

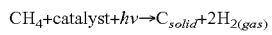
$CH_4+catalyst+hv \rightarrow C_{solid}+2H_{2(gas)}$

The process produces the greenest known form of hydrogen (turquoise hydrogen), greener than water electrolysis or methane pyrolysis, with a zero to negative-carbon footprint, zero demand for renewable electricity, and readily scalable using fixed or fluid bed photoreactor technology. Wherein "greenest known form of hydrogen" means there is little to no $CO_2$ or CO emission in the formation of the hydrogen. Light-emitting diodes (LEDs) can drive the process 24-7 thereby circumventing the intermittency of solar irradiation. The hydrogen is free of carbon dioxide, and the co-produced multiwalled carbon nanotubes can be re-used to sustain the process or used as feedstock for making a variety of products to improve the technoeconomics of the process.

Figure 1:
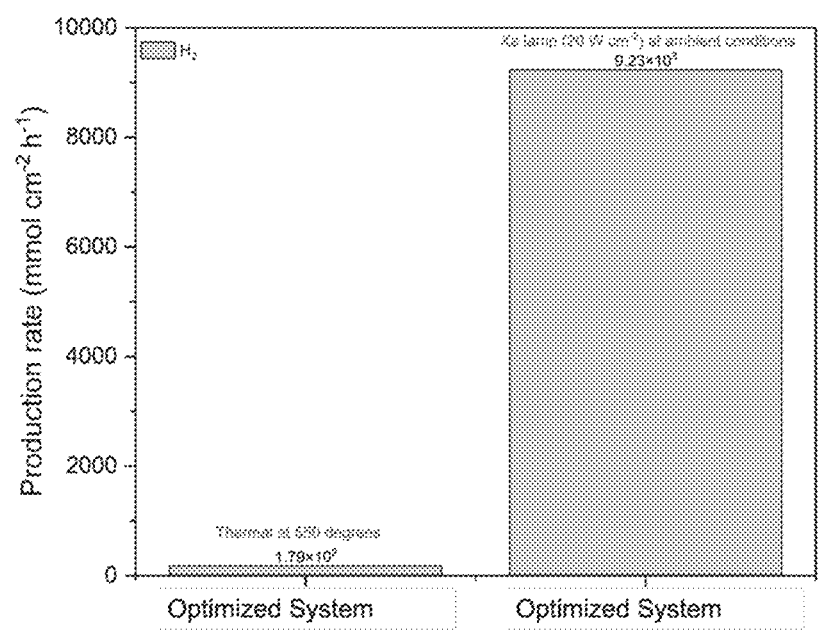
FIG. 1 shows the $H_2$ rate over metal particle catalyst from the traditional thermal catalytic methane pyrolysis at 550° C. and the solar catalytic methane decomposition (photolysis) approach. The solar catalytic methane decomposition reaction may be performed in a fixed bed reactor, in flow conditions, room temperature, atmospheric pressure, 10 sccm CH$_4$, 10 sccm Ar, and 1 cm$^2$ irradiating area. Alternatively, the thermal catalytic methane pyrolysis reaction may be performed in a tubular reactor, in flow conditions, at 550° C., atmospheric pressure, 10 sccm CH$_4$, and 10 sccm Ar.

The present disclosure will now be described by referencing the appended figures representing preferred embodiments. Referring to FIG. 1, a comparison between the rate of hydrogen production through thermal methane cracking and the innovative way of cracking methane using solar light is shown. The method disclosed herein applies solar light at different irradiance to decompose methane into hydrogen and O-MWCNT in the presence of a photocatalyst comprising transition metal particles supported by metal oxide as follows:

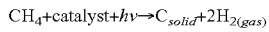
$CH_4+catalyst+hv \rightarrow C_{solid}+2H_{2(gas)}$

FIGS. 2A to 2D depict schematic representations of the examples of photoreactors that may be used. It will be appreciated by those skilled in the art that the photoreactors shown herein are exemplary of a wide variety of photoreactors that may be used. FIG. 2A depicts the horizontal fixed bed photoreactor where the feed gases (1) flow from to react over the surface of the catalyst (3) under light (5) passes through a quartz window (6) of a stainless-steel reactor (4) and the products (2) are collected and directed to a Gas Chromatography (GC) (GC used here in to separate and analyze the reaction products). Another fixed photoreactor configuration (vertical fixed bed photoreactor) may be used as well to facilitate the mechanical separation of the MWCNT from the surface of the catalyst. FIG. 2B depicts a quartz tubular reactor (24) that may be used to test the catalyst thermally using electric heaters (25) at high temperature. FIG. 2C and FIG. 2D are the photo fluidized bed reactors (4) that are exemplary of the solar catalytic methane decomposition (photolysis) approach shown herein. The reactor shown in FIG. 2C is similar to that shown in FIG. 2D but it also includes draft tubes (8). As shown herein a number of different reactor configurations may be used to produce multiwalled carbon nanotubes. Preferably a fluidized bed reactor is used as it that serves to prevent pressure drops, allows longer operation times, plus the vigorous movement of particles in the reactor that facilitates a more efficient transfer of mass and heat between the methane, the formed carbon and catalyst particles To scale up the process shown and described herein, an engineered photo-fluidized bed reactor may be used to provide a continuous addition and removal of carbon and catalyst particles and achieve optimum light utilization with minimum parasitic losses and uniform heat distribution.

It will be appreciated by those skilled in the art that a number of different approaches are shown herein. Different approaches may be used to favour different aspects of the output.

Referring to FIG. 3, this solar approach shows promising apparent activation energy (ca. 4.14 KJ/mol) compared to the traditional thermal approach which requires severe temperature 600-1200° C.) (ca. 58.71 KJ/mol. The solar methane cracking process disclosed here shows a lower activation energy which could explain the unprecedented fast $H_2$ and O-MWCNT production rate compared to the thermal cracking one. In one aspect, conventional methane thermal cracking needs higher energy to break the C—H bond and causes significant chemical and/or microstructural changes to the catalyst due to overheating as well as the formation of amorphous carbon. In other aspects, the solar methane cracking approach disclosed here reduces the energy required to break the C—H bond and produces ordered carbon formation. The solar methane cracking approach shows a high selectivity towards forming high-quality O-MWCNT of an outer diameter of between 10 to 50 nm (an average diameter of ca. 17 nm) and a length of between 20 nm to 50 μm length compared to the traditional thermal cracking, which forms amorphous carbon and CNT (see FIG. 4 and FIG. 5).

Referring to FIG. 6, the conventional methane thermal cracking approach tends to form tip-grown CNTs owing to the catalyst overheating that detaches the metal from the support, which in the end, causes the metal particles to sinter and form graphitic layers than CNT. These tip-grown CNTs are hardly separated from the catalyst and if this happens, it deteriorates the quality of the separated CNT. On the other aspect, the solar methane cracking approach disclosed here forms base-grown CNTs, where the metal is attached firmly to the support and the CNT stems from it. This approach to CNT growth offers a facile separation of the CNT either chemically or mechanically without deteriorating the quality of the separated CNT.

HRTEM images confirm the multiwalled structure of this photo-grown CNT (ca. 40 wall) and also reveal an interlayer spacing of ca. 3.33 Å, similar to single crystal graphite interlayer spacing (see FIG. 7).

Referring to FIGS. 8A and 8B, Raman spectroscopy is used to identify the quality of the formed carbon through ID/IG ratio that represents the ratio of the structured (ordered/crystalline) carbon to the unstructured (disordered) carbon in the sample. The D-band represents the disordered carbon structure and is located between 1300-1400 cm$^{-1}$ and the G-band represents the ordered SP$^2$ hybridized carbon in the sample and is located between 1500-1600 cm$^{-1}$. A relatively high ID/IG (the intensity ratio of D-band to the G-band) ratio indicates a high content of the disordered carbon in the sample, while a relatively low ID/IG ratio indicates a high content of the ordered SP$^2$ hybridized carbon in the sample. The metal particle catalyst before solar methane cracking did not show any carbon formation and did not feature any ID/IG ratio (80). The metal particle spent catalyst post solar methane cracking (81) and (82) features a lower ID/IG ratio compared to the spent catalyst post thermal methane cracking (83) (see FIG. 8A). Increasing the solar irradiance from 8 W cm$^{-2}$ (81) to 20 W cm$^{-2}$ (82), increases the ID/IG ratio, which is possibly due to the overheating of the sample at relatively high solar light intensity. The separated MWCNT (882) from the spent metal particle catalyst post the solar methane cracking, shows a slightly higher ID/IG ratio compared to the commercial sigma MWCNT (881) owing to the formed surface oxygen functional groups (see FIG. 8B).

Referring to FIG. 9, thermogravimetric analysis (TGA) is used herein to determine the crystallinity of the formed MWCNT by measuring the sample's weight change overtime as the temperature changes. The spent metal particle catalyst post the solar methane cracking (92) does not show any thermal degradation in the following temperature range 150-550° C. compared to the fresh catalyst (91) and the commercial MWCNT (93) (amorphous carbon thermal degradation range), which confirms the crystallinity of the formed MWCNT on the metal particle spent catalyst.

Referring to FIG. 10, Powder X-ray diffraction (PXRD) is used herein to gain information about the crystallinity and the degree of graphitization of the formed solid carbon. PXRD patterns of the spent metal particle catalyst after methane pyrolysis (103), and the spent metal particle catalyst after methane photolysis (102), show the presence of the graphitic carbon (002) at 26.2°, compared to the fresh catalyst (101). The intensity of the diffraction peak (002) is related to the degree of graphitization.

Referring to FIG. 11, X-ray photoelectron spectroscopy is used herein to gain information about the surface chemistry and the elemental composition of the metal particle catalyst post the thermal and photo methane cracking reaction compared to the pristine metal particle catalyst. The metal particle catalyst post the solar methane cracking, shows a higher elemental carbon composition than the pristine catalyst. These results confirm the formation of the MWCNT (see FIG. 11A and FIG. 11B). The high-resolution C1s XPS spectra of the post-reaction catalyst showed higher C—C/C═C and less C═O compared to the pristine catalyst confirming the ordered nature of the formed carbon post the solar methane cracking reaction (see FIG. 11C and FIG. 11D).

The high-resolution metal (Ni2p) spectra of the metal particle catalyst post the solar methane cracking shows almost the same spectra of the pristine metal particle catalyst confirming that the solar methane cracking reaction does not induce any change in the chemical structural of the catalyst post the reaction at low solar irradiation (see FIG. 11E and FIG. 11F).

Referring to FIG. 12, FIG. 13, and FIG. 14, Brunauer-Emmett-Teller (BET) surface area analysis and Barrett-Joyner-Halenda (BJH) pore size and pore volume distribution are used herein, to determine the surface area, the pore size and pore volume distribution of the fresh metal particle catalyst (121), spent metal particle catalyst (122) and (123) and the separated MWCNT. The metal particle catalyst post solar methane cracking reaction 122 possesses a slightly higher surface area, pore size and pore volume compared to the catalyst post thermal methane cracking 123). In another aspect, the mechanically separated O-MWCNT features larger, surface area, pore size and pore volume than the pristine and the spent metal particle catalysts (see FIG. 13).

Referring to FIG. 15A and FIG. 15B, the C1s and O1s high resolution XPS spectra of the mechanically separated O-MWCNT are depicted. The separated C1s features contain C—C and C—OH, C═O, O—C—O and π-π^* peaks at 284.3, 284.7, 286, 290 eV respectively, In FIG. 15B the formation of oxygen functional groups on the MWCNT surfaces is more clearly confirmed by the changes in the integrated peak areas. The features corresponding to oxygen, C—O, C—OH, and C═O appeared at 533.2, 531.6, and 530.1 eV, respectively.

Referring to FIG. 16, FTIR spectrum of the mechanically separated O-MWCNT, confirms the formation of oxygen functional groups on the MWCNT surfaces.

Referring to FIG. 17, a schematic illustrates the oxygen functional groups on the surfaces of the mechanically separated MWCNT.

Referring to FIG. 18, the metal particle catalyst combination of 10% metal content, gives the H$_2$ production rate compared to the support and the photo grown MWCNT (FIG. 18A). In other aspect, 10% metal content, is the metal content on the support that forms MWCNT and gives the highest H$_2$ production rate (FIG. 18B).

Referring to FIG. 19, Powder X-ray diffraction (PXRD) is used to confirm the presence, the crystallinity, and the degree of graphitization of the formed solid carbon. PXRD patterns of the spent metal particle catalyst beyond 5% metal particle content (193) and (194) show the presence of the graphitic carbon (002) at 26.2°, compared to 1% and the 5% metal particle content respectively (191) and (192).

Referring to FIG. 20, the solar methane cracking reaction may be performed using a 300 W Xe lamp of various light intensities, to demonstrate the H$_2$ production and evaluate the photochemical and photothermal behaviour. The inset of FIG. 20 shows a linear rate graph in the low light intensities and displays an exponential Arrhenius type behaviour at intensities beyond 12 W cm$^{-2}$, respectively. This suggests a dominant photochemical behaviour at a low light intensity below 12 W cm$^{-2}$ and a photothermal behaviour beyond 12 W cm$^{-2}$.

Referring to FIG. 21, the PXRD pattern of the spent metal particle catalyst at various light intensities show the formation of the MWCNT compared to the fresh optimized system (see FIG. 21A). An IR camera may be used to measure the surface temperature of the metal particle catalyst in the reactor with $CaF_2$ window under various light intensities (see FIG. 21B). In the example shown herein the maximum measured temperature was 410° C. due to the intrinsic light absorbance characteristic of the material and light intensity used.

Referring to FIG. 22, Bandpass filters were used to evaluate the wavelength dependency of the reaction. In the examples shown herein the Xe lamp intensity was set to ensure all samples had the same incident photon flux regardless of the used wavelength. 495 nm filter displays the highest $H_2$ production rate and also a linear increase in the $H_2$ rate at various light intensity, suggesting a photochemical behaviour for wavelengths higher than 495 nm (mainly the visible region).

In the example shown in FIG. 23, aiming to deconvolute the photochemical and the photothermal contribution, the metal particle catalyst was heated to the same temperature caused by the light irradiation at various intensities and measured by the IR camera. Then, the catalytic performance was measured in the dark and under light irradiation conditions. The reaction rates are higher under light irradiation compared to dark. This indicates the favoured effect of the incident photons in accelerating the methane cracking reaction.

Referring to FIG. 24, the stability test of the catalyst in a fixed bed photoreactor (FIG. 2A) at low (3.5 W $cm^{-2}$: FIG. 24A) (12 W $cm^{-2}$: FIG. 24B) and high light intensity (20 W $cm^{-2}$: FIG. 24C) shows that the hydrogen production rate decreases till it saturates to reach the activity of the formed carbon on the surface of the metal particle catalyst.

Referring to FIG. 25, regenerating the metal particle catalyst after carbon formation through collecting the carbon and mixing it with the metal particle catalyst.

The procedure for kinetic experiments is shown in FIG. 26 where Xe arc lamp light intensity was set to 10.6 W cm 2 and the reactor pressure was set to 14.6 psi in each run.

The reactivity of the photo-driven methane degradation may be evaluated using the time expression represented in Equation (1).

$$t = Ao \int_{fA1}^{fA2} \frac{dfA}{(rA)SA} \quad (1)$$

Where Ao is the initial $CH_4$ moles, rA is the $CH_4$ reaction rate, SA is the exposed surface area to light, and fA1 and fA2 are the fractions of reactants over the time ($CH_4$ concentration remaining).

From the first-rate law.

$$rA = k[A] \quad (2)$$

Where k is the reaction constant and [A] is the $CH_4$ concentration over time, Graphically, the reaction order (n=0.041) for the solar methane cracking reaction is shown in equation (3). This result suggested that the mechanism of solar methane cracking could proceed independent of the reactant concentration using light, $$\ln(rA) = \ln k + n \ln(A) \quad (3)$$

From equation (2), [A] can be replaced as the mol fraction expression $$fA = \frac{Ao - [A]}{Ao} \quad (4)$$

to produce (5)

$$rA = k(Ao)(1 - fA) \quad (5)$$

Once we replace (5) in (1) and integrate over the reaction fraction fA1 and fA2 we could obtain the reaction constant k for each reaction time as presented in (6)

$$k = \frac{1}{SA.t}(-\ln(1 - fA)) \quad (6)$$

As a result, k=0.446±0.105 $h^{-1}$ was calculated from each step time and stoichiometry of the reaction produced 2×rA which represents $H_2$ rate is calculated as 6.98±1.71 mmol cm-2 $h^{-1}$.

A multiwalled carbon nanotube includes at least 2 carbon nanotube walls. The multiwalled carbon nanotube have an outer surface and at least a portion of an oxygen functional group is attached to the outer surface thereof. Up to 5 atomic percent of the multiwalled carbon nanotube surface is an oxygen functional group. The surface atomic ratio of carbon to oxygen is between 17:1 and 19:1.

The spacing between the walls of the multiwalled carbon nanotube may be between 3.33 to 6 Å.

Each carbon nanotube wall may have an outer diameter of between 10 to 50 nm.

Each carbon nanotube wall may have a length of between 20 nm to 50 μm length.

The multiwalled carbon nanotube may include between 20 and 50 walls.

The multiwalled carbon nanotube may be a plurality of multiwalled carbon nanotubes including base-growth carbon nanotubes, tip-growth carbon nanotubes, and a combination thereof.

The multiwalled carbon nanotube may be a plurality of multiwalled carbon nanotubes having an average of 40 walls.

The spacing between the carbon nanotube walls may be an average of 3.33 Å.

The multiwalled carbon nanotube may have a plurality of carbon nanotubes having an average outer diameter of 17 nm.

The multiwalled carbon nanotube may be free of amorphous carbon.

The multiwalled carbon nanotube may have a BET (Brunauer-Emmett-Teller) surface area of from 180 $m^2$ $g^{-1}$ to 300 $m^2$ $g^{-1}$.

The multiwalled carbon nanotube may have a pore volume of from 0.2 $cm^3$ $g^{-1}$ to 2.1 $cm^3$ $g^{-1}$.

The oxygen functional group may be one of hydroxyl group, molecular oxygen and a combination thereof.

The multiwalled carbon nanotube may be formed into a powder.

A photocatalysis process to produce hydrogen and at least one solid carbon nanostructure includes the steps of: applying light to saturated hydrocarbons in the presence of a metal particle supported metal oxide photocatalyst to produce at least hydrogen gas and at least one solid carbon nanostructure; separating the hydrogen from at least one solid carbon nanostructure; and collecting the separated hydrogen and the at least one solid carbon nanostructure.

In the photocatalysis process, the saturated hydrocarbons may be one of methane, ethane, propane, butane, hexane, heptane, octane and a combination thereof.

In the photocatalysis process, the metal of the metal supported metal oxide photocatalyst may be one of Ti, Zr, V, Nb, Ta, Cr, Mo, W, Mn, Tc, Re, Fe, Ru, Ni, Pd, Pt, Cu, Ag, Au, Zn, Cd, Hg and a combination thereof.

In the photocatalysis process, the content of the metal particles of the metal supported metal oxide photocatalyst is in the range of 1 to 100% by weight.

In the photocatalysis process, the metal oxide of the metal particle supported metal oxide photocatalyst may include a typical supporting solid carbon product, main group metal and transition group metal oxides such as $Al_2O_3$, SiC, $SiO_2$, $TiO_2$, $ZrO_2$, MgO, a zeolite, clay, aerogel, perovskite, ilmentite, delafossite, and a combination thereof.

In the photocatalysis process, the light intensity may be in the range of 2-200 $W\ cm^{-2}$.

In the photocatalysis process, the light may be one of natural and simulated light.

In the photocatalysis process, the light wavelength may be from 200 nm to 2500 nm.

In the photocatalysis process, the light wavelength may include: (a) ultraviolet region from 200 nm to 405 nm within the mentioned intensities; (b) blue light region between 405 nm to 495 nm in the range of the mentioned intensities; (c) the visible and green region between 495 nm to 625 nm in the range of the mentioned intensities; and (d) the infrared region comprising the mentioned intensities between 625 nm to 2500 nm.

In the photocatalysis process, the saturated hydrocarbon may have a concentration in the range of 0.01-100% by volume to a balancing gas and the balance gas is one of He, $N_2$, Ne, Ar, Kr, Xe, or a combination thereof.

A multiwalled carbon nanotube includes at least 2 carbon nanotube walls. The multiwalled carbon nanotube have an outer surface and at least a portion of an oxygen functional group is attached to the outer surface thereof. Up to 5 atomic percent of the multiwalled carbon nanotube surface is an oxygen functional group. The surface atomic ratio of carbon to oxygen is between 17:1 and 19:1.

The spacing between the walls of the multiwalled carbon nanotube may be between 3.33 to 6 Å.

Each carbon nanotube wall may have an outer diameter of between 10 to 50 nm.

Each carbon nanotube wall may have a length of between 20 nm to 50 μm length.

The multiwalled carbon nanotube may include between 20 and 50 walls.

The multiwalled carbon nanotube may be a plurality of multiwalled carbon nanotubes including base-growth carbon nanotubes, tip-growth carbon nanotubes, and a combination thereof.

The multiwalled carbon nanotube may be a plurality of multiwalled carbon nanotubes having an average of 40 walls.

The spacing between the carbon nanotube walls may be an average of 3.33 Å.

The multiwalled carbon nanotube may have a plurality of carbon nanotubes having an average outer diameter of 17 nm.

The multiwalled carbon nanotube may be free of amorphous carbon.

The multiwalled carbon nanotube may have a BET (Brunauer-Emmett-Teller) surface area of from 180 m2 g-1 to 300 m2 g-1.

The multiwalled carbon nanotube may have a pore volume of from 0.2 cm3 g-1 to 2.1 cm3 g-1.

The oxygen functional group may be one of hydroxyl group, molecular oxygen and a combination thereof.

The multiwalled carbon nanotube may be formed into a powder.

A photocatalysis process to produce hydrogen and at least one solid carbon nanostructure includes the steps of: applying light to saturated hydrocarbons in the presence of a metal particle supported metal oxide photocatalyst to produce at least hydrogen gas and at least one solid carbon nanostructure; separating the hydrogen from at least one solid carbon nanostructure; and collecting the separated hydrogen and the at least one solid carbon nanostructure.

In the photocatalysis process, the saturated hydrocarbons may be one of methane, ethane, propane, butane, hexane, heptane, octane and a combination thereof.

In the photocatalysis process, the metal of the metal supported metal oxide photocatalyst may be one of Ti, Zr, V, Nb, Ta, Cr, Mo, W, Mn, Tc, Re, Fe, Ru, Ni, Pd, Pt, Cu, Ag, Au, Zn, Cd, Hg and a combination thereof.

In the photocatalysis process, the content of the metal particles of the metal supported metal oxide photocatalyst is in the range of 1 to 100% by weight.

In the photocatalysis process, the metal oxide of the metal particle supported metal oxide photocatalyst may include a typical supporting solid carbon product, main group metal and transition group metal oxides such as Al2O3, SiC, SiO2, TiO2, ZrO2, MgO, a zeolite, clay, aerogel, perovskite, ilmentite, delafossite, and a combination thereof.

In the photocatalysis process, the light intensity may be in the range of 2-200 $W\ cm^{-2}$.

In the photocatalysis process, the light may be one of natural and simulated light.

In the photocatalysis process, the light wavelength may be from 200 nm to 2500 nm.

In the photocatalysis process, the light wavelength may include: (a) ultraviolet region from 200 nm to 405 nm within the mentioned intensities; (b) blue light region between 405 nm to 495 nm in the range of the mentioned intensities; (c) the visible and green region between 495 nm to 625 nm in the range of the mentioned intensities; and (d) the infrared region comprising the mentioned intensities between 625 nm to 2500 nm. In the photocatalysis process, the saturated hydrocarbon may have a concentration in the range of 0.01-100% by volume to a balancing gas and the balance gas is one of He, $N_2$, Ne, Ar, Kr, Xe, or a combination thereof.

The invention claimed is:

1. A photocatalysis process to produce hydrogen and at least one oxygen functionalized multiwalled carbon nanotube, comprising the steps of:
    applying light to saturated hydrocarbons in the presence of a metal particle supported metal oxide photocatalyst to produce the hydrogen and the at least one oxygen functionalized multiwalled carbon nanotube, wherein a light intensity is in a range of 2-200 $W\ cm^{-2}$ and wherein a wavelength of the light is from 200 nm to 2500 nm;
    separating the hydrogen from the at least one oxygen functionalized multiwalled carbon nanotube; and
    collecting the separated hydrogen and the at least one oxygen functionalized multiwalled carbon nanotube.

2. The photocatalysis process of claim 1 wherein the saturated hydrocarbons are one of methane, ethane, propane, butane, hexane, heptane, octane and a combination thereof.

3. The photocatalysis process of claim 1 wherein the metal of the metal particle supported metal oxide photocatalyst is one of Ti, Zr, V, Nb, Ta, Cr, Mo, W, Mn, Tc, Re, Fe, Ru, Ni, Pd, Pt, Cu, Ag, Au, Zn, Cd, Hg and a combination thereof.

4. The photocatalysis process of claim 1 wherein the content of the metal particles of the metal particle supported metal oxide photocatalyst is in the range of 1 to 100% by weight.

5. The photocatalysis process of claim 1 wherein the light is one of natural and simulated light.

6. The photocatalysis process of claim 1 wherein the wavelength of the light comprises:
  (a) ultraviolet region from 200 nm to 405 nm within the light intensity range;
  (b) blue light region between 405 nm to 495 nm within the light intensity range;
  (c) the visible and green region between 495 nm to 625 nm within the light intensity range; and
  (d) the infrared region between 625 nm to 2500 nm within the light intensity range.

7. The photocatalysis process of claim 1 wherein the saturated hydrocarbon has a concentration in the range of 0.01-100% by volume to a balancing gas and the balancing gas is one of He, $N_2$, Ne, Ar, Kr, Xe, or a combination thereof.

8. The photocatalysis process of claim 1 wherein the at least one oxygen functionalized multiwalled carbon nanotube is a plurality of oxygen functionalized multiwalled carbon nanotubes including base-growth oxygen functionalized multiwalled carbon nanotubes, tip-growth oxygen functionalized multiwalled carbon nanotubes, and a combination thereof.

9. The photocatalysis process of claim 1 wherein the at least one oxygen functionalized multiwalled carbon nanotube is a plurality of oxygen functionalized multiwalled carbon nanotubes and the oxygen functionalized multiwalled carbon nanotubes are free of amorphous carbon.

10. The photocatalysis process of claim 1 further including the step of forming the at least one oxygen functionalized multiwalled carbon nanotube into a powder.

11. The photocatalysis process of claim 1 wherein the metal oxide of the metal particle supported metal oxide photocatalyst comprises a solid carbon support, main group metal and transition group metal oxides.

12. The photocatalysis process of claim 11 wherein the metal oxide of the metal particle supported metal oxide photocatalyst comprises any one or combination of $Al_2O_3$, SiC, $SiO_2$, $TiO_2$, $ZrO_2$, MgO, a zeolite, clay, aerogel, perovskite, and ilmenite, delafossite.

13. The photocatalysis process of claim 1 wherein the at least one oxygen functionalized multiwalled carbon nanotube comprises:
  at least 2 carbon nanotube walls;
  the at least one oxygen functionalized multiwalled carbon nanotube having an outer surface and at least a portion of an oxygen functional group being attached to the outer surface thereof;
  wherein up to 5 atomic percent of the at least one oxygen functionalized multiwalled carbon nanotube surface is an oxygen functional group; and
  wherein the surface atomic ratio of carbon to oxygen is between 17:1 and 19:1.

14. The photocatalysis process of claim 13 wherein the at least one oxygen functionalized multiwalled carbon nanotube is a plurality of oxygen functionalized multiwalled carbon nanotubes and the spacing between the walls of the multiwalled carbon nanotube is between 3.33 to 6 Å.

15. The photocatalysis process of claim 13 wherein the at least one oxygen functionalized multiwalled carbon nanotube is a plurality of oxygen functionalized multiwalled carbon nanotubes and each carbon nanotube wall has an outer diameter of between 10 to 50 nm.

16. The photocatalysis process of claim 13 wherein the at least one oxygen functionalized multiwalled carbon nanotube is a plurality of oxygen functionalized multiwalled carbon nanotubes and each oxygen functionalized multiwalled carbon nanotube wall has a length of between 20 nm to 50 μm.

17. The photocatalysis process of claim 13 wherein the at least one oxygen functionalized multiwalled carbon nanotube includes between 2 and 50 walls and the spacing between the walls is an average of 3.33 Å.

18. The photocatalysis process of claim 13 wherein the oxygen functionalized multiwalled carbon nanotube is a plurality of oxygen functionalized multiwalled carbon nanotubes having an average outer diameter of 17 nm.

19. The photocatalysis process of claim 13 wherein the at least one oxygen functionalized multiwalled carbon nanotube is a plurality of oxygen functionalized multiwalled carbon nanotubes and the oxygen functionalized carbon nanotubes have a BET (Brunauer-Emmett-Teller) surface area of from 180 $m^2$ $g^{-1}$ to 300 $m^2$ $g^{-1}$.

20. The photocatalysis process of claim 13 wherein the at least one oxygen functionalized multiwalled carbon nanotube is a plurality of oxygen functionalized multiwalled carbon nanotubes and the oxygen functionalized multiwalled carbon nanotubes have a pore volume of from 0.2 $cm^3$ $g^{-1}$ to 2.1 $cm^3$ $g^{-1}$.

21. The photocatalysis process of claim 13 wherein the oxygen functional group is one of hydroxyl group, molecular oxygen and a combination thereof.

* * * * *